United States Patent
Hinohara et al.

(10) Patent No.: US 9,307,196 B2
(45) Date of Patent: Apr. 5, 2016

(54) APPARATUS, METHOD, AND RECORD MEDIUM OF TRANSMISSION MANAGEMENT

(71) Applicants: Hiroshi Hinohara, Kanagawa (JP); Takahiro Asai, Kanagawa (JP); Yuuta Hamada, Tokyo (JP); Ryoji Shimamoto, Kanagawa (JP)

(72) Inventors: Hiroshi Hinohara, Kanagawa (JP); Takahiro Asai, Kanagawa (JP); Yuuta Hamada, Tokyo (JP); Ryoji Shimamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/659,162

(22) Filed: Mar. 16, 2015

(65) Prior Publication Data
US 2015/0264311 A1 Sep. 17, 2015

(30) Foreign Application Priority Data
Mar. 17, 2014 (JP) ................................. 2014-054116

(51) Int. Cl.
| | | |
|---|---|---|
| H04N 7/14 | (2006.01) | |
| H04N 7/15 | (2006.01) | |
| H04L 29/06 | (2006.01) | |
| H04L 12/26 | (2006.01) | |
| H04L 12/24 | (2006.01) | |
| H04L 29/12 | (2006.01) | |

(52) U.S. Cl.
CPC ............... *H04N 7/147* (2013.01); *H04L 41/00* (2013.01); *H04L 43/065* (2013.01); *H04L 65/60* (2013.01); *H04N 7/155* (2013.01); *H04L 61/1541* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,907,556 | A | * | 5/1999 | Hisanaga | ................ H04L 47/10 370/235 |
| 7,443,882 | B2 | * | 10/2008 | Ohki | ....................... H04L 47/10 370/230 |
| 7,633,938 | B2 | * | 12/2009 | Kinoshita | ............... H04L 45/00 370/252 |
| 8,964,713 | B2 | | 2/2015 | Hinohara et al. | |
| 2002/0194361 | A1 | * | 12/2002 | Itoh | ....................... H04L 1/0002 709/233 |
| 2003/0074406 | A1 | * | 4/2003 | Noble | ................. G06F 21/6218 709/205 |
| 2014/0240441 | A1 | | 8/2014 | Hinohara et al. | |
| 2014/0240449 | A1 | | 8/2014 | Hinohara et al. | |
| 2014/0240770 | A1 | | 8/2014 | Hinohara et al. | |

FOREIGN PATENT DOCUMENTS

JP 2009-009260 1/2009

* cited by examiner

*Primary Examiner* — Joseph J Nguyen
(74) *Attorney, Agent, or Firm* — Oblon, McClelland, Maier & Neustadt, L.L.P.

(57) ABSTRACT

A transmission management apparatus, method, and recording medium are provided, including a memory configured to store address information that associates, for each one of a plurality of request source terminals, request source terminal identification information and candidate counterpart terminal identification information; a receiver configured to receive connection request information from a transmission terminal as the request source terminal; and processing circuitry configured to: determine whether to provide status information of the transmission terminal of another transmission management apparatus, based on information of said another apparatus associated with the at least one candidate counterpart terminal, to generate a determination result when the receiver receives the connection request information, provide the status information of the transmission terminal of said another apparatus based on the determination result, and acquire status information of the at least one candidate counterpart terminal managed by said another apparatus included in the address information of the transmission terminal.

8 Claims, 20 Drawing Sheets

FIG. 7

| RELAY APPARATUS ID | OPERATION STATUS | RECEIPT TIME AND DATE | IP ADDRESS OF RELAY APPARATUS | MAXIMUM DATA TRANSMISSION SPEED (Mbps) |
|---|---|---|---|---|
| 111a | ONLINE | 2013.11.10.13:00 | 1.2.1.2 | 100 |
| 111b | ONLINE | 2013.11.10.13:10 | 1.2.2.2 | 1000 |
| 111c | OFFLINE | 2013.11.10.13:20 | 1.3.1.2 | 100 |
| 111d | ONLINE | 2013.11.10.13:30 | 1.3.2.2 | 10 |

FIG. 8

| SESSION ID | RELAY APPARATUS ID | REQUEST SOURCE COMMUNICATION ID | COUNTERPART COMMUNICATION ID |
|---|---|---|---|
| se1 | 111a | 02aa | 01ab |
| se2 | 111b | 01ba | 01ca |
| se3 | 111d | 01bb | 01da |
| ... | ... | ... | ... |

FIG. 9A

| COMMUNICATION ID | DESTINATION ADDRESS |
|---|---|
| 01aa | 01ab@VIDEO CONFERENCE MANAGEMENT SYSTEM, ... |
| 01ab | 01aa@VIDEO CONFERENCE MANAGEMENT SYSTEM, 02aa@TEXT CHAT MANAGEMENT SYSTEM, ... |
| ... | ... |
| 01ba | 01bb@VIDEO CONFERENCE MANAGEMENT SYSTEM, 01ca@VIDEO CONFERENCE MANAGEMENT SYSTEM, ... |
| 01bb | 01ba@VIDEO CONFERENCE MANAGEMENT SYSTEM, 02bb@TEXT CHAT MANAGEMENT SYSTEM, ... |
| ... | ... |

FIG. 9B

| COMMUNICATION ID | DESTINATION ADDRESS |
|---|---|
| 02aa | 02ab@TEXT CHAT MANAGEMENT SYSTEM, 01ab@VIDEO CONFERENCE MANAGEMENT SYSTEM, ... |
| 02ab | 02aa@TEXT CHAT MANAGEMENT SYSTEM, ... |
| ... | ... |
| 02ba | 02bb@TEXT CHAT MANAGEMENT SYSTEM, ... |
| 02bb | 02ba@TEXT CHAT MANAGEMENT SYSTEM, 01bb@VIDEO CONFERENCE MANAGEMENT SYSTEM, ... |
| ... | ... |

FIG. 10

| SERVICE NAME | MANAGEMENT SYSTEM NAME |
|---|---|
| VIDEO CONFERENCE | VIDEO CONFERENCE MANAGEMENT SYSTEM |
| TEXT CHAT | TEXT CHAT MANAGEMENT SYSTEM |
| ... | ... |

FIG. 11

| COMMUNICATION ID | PASSWORD |
|---|---|
| 01aa | aaaa |
| 01ab | abab |
| 01ba | baba |
| ... | ... |
| 02aa | aabb |
| 02ab | bbaa |
| ... | ... |

FIG. 12

| TERMINAL TYPE NAME | SERVICE NAME |
|---|---|
| VIDEO CONFERENCE | VIDEO CONFERENCE |
| GENERAL-PURPOSE | VIDEO CONFERENCE, TEXT CHAT |
| TEXT CHAT | TEXT CHAT |
| ... | ... |

FIG. 13

| COMMUNI-CATION ID | NAME | OPERATION STATUS | NOTIFICATION DESTINATION | RECEIPT TIME AND DATE | IP ADDRESS |
|---|---|---|---|---|---|
| 01aa | AA CONFERENCE TERMINAL | ONLINE (COMMUNICATION OK) | — | 2013.11.10.13:40 | 1.2.1.3 |
| 01ab | AB CONFERENCE TERMINAL | OFFLINE | | 2013.11.09.12:00 | 1.2.1.4 |
| ... | ... | ... | ... | ... | ... |
| 01ba | BA CONFERENCE TERMINAL | ONLINE (COMMUNICATING) | — | 2013.11.10.13:45 | 1.2.2.3 |
| 01bb | BB CONFERENCE TERMINAL | ONLINE | | 2013.11.10.13:50 | 1.2.2.4 |
| ... | ... | ... | ... | ... | ... |
| 02aa | AA MOBILE TERMINAL | ONLINE (COMMUNICATION OK) | VIDEO CONFERENCE MANAGEMENT SYSTEM | 2013.11.25.14:30 | 1.4.1.1 |
| 02ab | AB MOBILE TERMINAL | ONLINE (COMMUNICATION OK) | — | 2013.11.25.14:29 | 1.4.1.2 |
| ... | ... | ... | ... | ... | ... |
| 02ba | BA MOBILE TERMINAL | OFFLINE | VIDEO CONFERENCE MANAGEMENT SYSTEM | 2013.11.24.13:30 | 1.5.1.1 |
| 02bb | BB MOBILE TERMINAL | ONLINE (COMMUNICATION OK) | | 2013.11.15.14:25 | 1.5.1.2 |
| ... | ... | ... | ... | ... | ... |

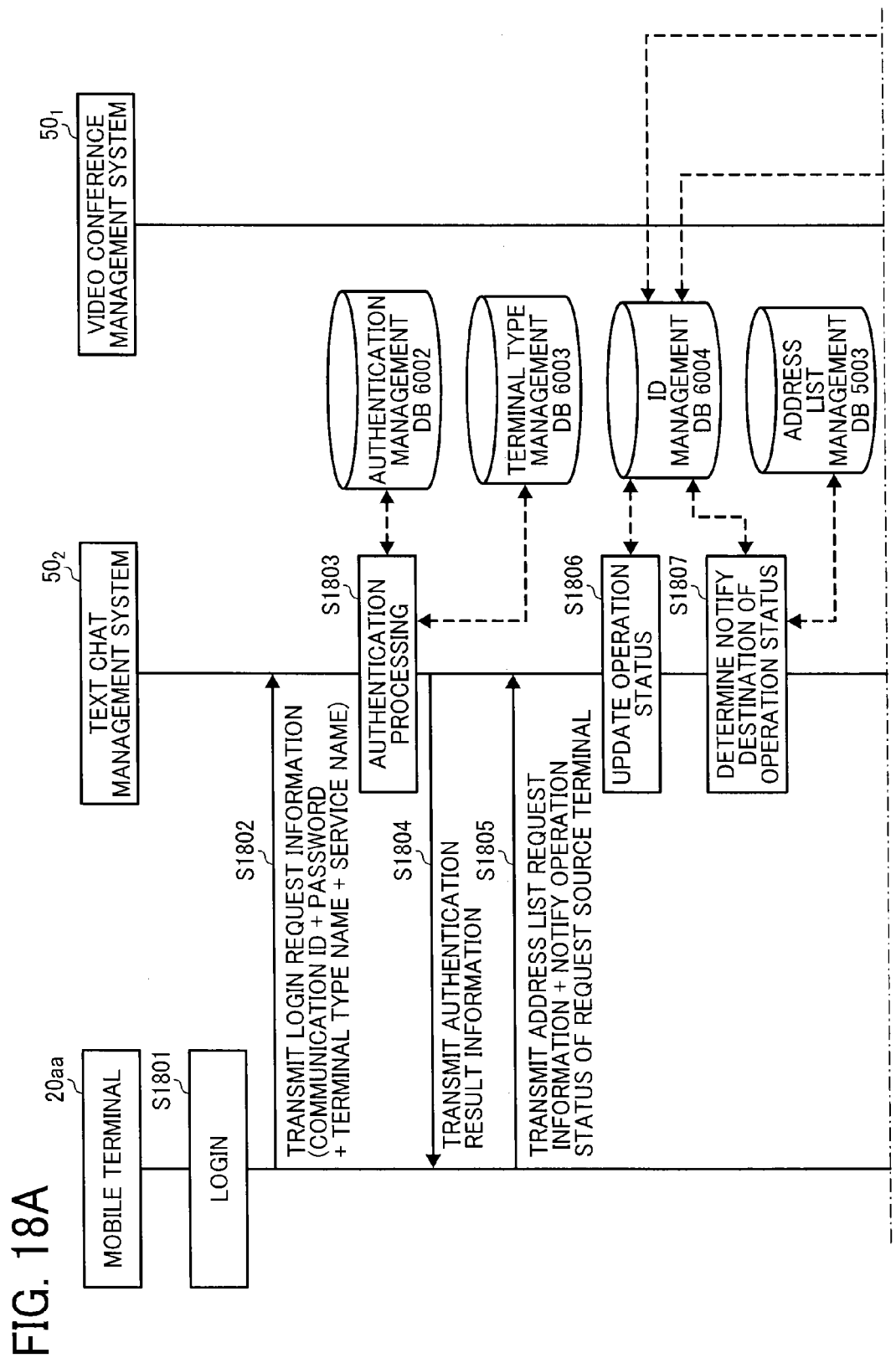

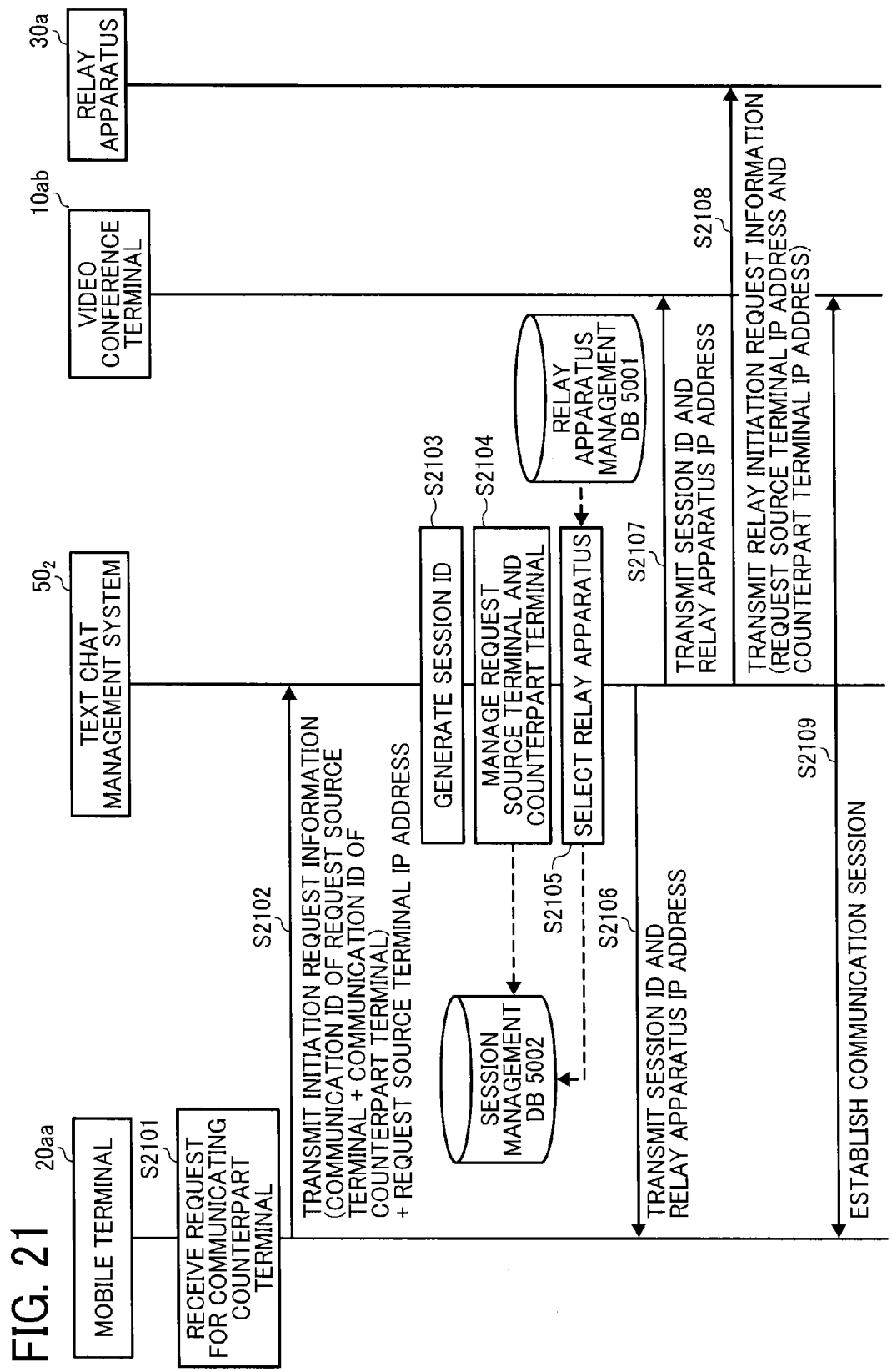

APPARATUS, METHOD, AND RECORD MEDIUM OF TRANSMISSION MANAGEMENT

CROSS-REFERENCE TO RELATED APPLICATIONS

This patent application is based on and claims priority pursuant to 35 U.S.C. §119 to Japanese Patent Application No. 2014-054116, filed on Mar. 17, 2014 in the Japan Patent Office, the entire disclosure of which is incorporated by reference herein.

BACKGROUND

1. Technical Field

Embodiments discussed herein relate to providing the operation status of a transmission terminal of a transmission management system.

2. Description of the Related Art

Transmission systems that perform a remote communication (e.g., video conference, text chat) via a communication network, such as the Internet, have become popular in recent years due to a demand for reducing business trip costs and time. In such a transmission system, once communication between or among a plurality of transmission terminals starts, image data, sound data, or text data are transmitted and received, thereby realizing a remote communication.

Japanese Patent Application Laid-open No. 2009-009260 discloses a notification method that includes providing the status of utilization of a terminal in different services.

SUMMARY

A transmission management apparatus, method, and recording medium are provided. A transmission management apparatus is provided, comprising: a memory configured to store address information that associates, for each one of a plurality of request source terminals, request source terminal identification information for identifying the request source terminal configured to request starting communication with at least one candidate counterpart terminal, and candidate counterpart terminal identification information for identifying the at least one candidate counterpart terminal; a receiver configured to receive connection request information from a transmission terminal as the request source terminal; and processing circuitry configured to: determine whether to provide status information of the transmission terminal of another transmission management apparatus, based on information of the another transmission management apparatus associated with the at least one candidate counterpart terminal included in the address information of the transmission terminal, to generate a determination result when the receiver receives the connection request information, provide the status information of the transmission terminal of the another transmission management apparatus based on the determination result, and acquire status information of the at least one candidate counterpart terminal managed by the another transmission management apparatus included in the address information of the transmission terminal for notifying the transmission terminal when the transmission management apparatus provides the status information of the transmission terminal of the another transmission management apparatus.

A method of providing status information in a communication system is also provided, comprising: storing, in a memory of a transmission management apparatus, address information that associates, for each one of a plurality of request source terminals, request source terminal identification information for identifying the request source terminal configured to request starting communication with at least one candidate counterpart terminal, and candidate counterpart terminal identification information for identifying the at least one candidate counterpart terminal; receiving, in the memory, connection request information from a transmission terminal as the request source terminal; determining, using processing circuitry, whether to provide status information of the transmission terminal of another transmission management apparatus, based on information of the another transmission management apparatus associated with the at least one candidate counterpart terminal included in the address information of the transmission terminal, to generate a determination result when the receiver receives the connection request information; providing, using the processing circuitry, the status information of the transmission terminal of the another transmission management apparatus based on the determination result; and acquiring, using the processing circuitry, status information of the at least one candidate counterpart terminal managed by the another transmission management apparatus included in the address information of the transmission terminal for notifying the transmission terminal when the transmission management apparatus provides the status information of the transmission terminal of the another transmission management apparatus.

A non-transitory recording medium storing a plurality of instructions is also provided, which, when executed by a processor, cause the processor to perform a method of providing status information in a communication system, comprising: storing, in a memory of a transmission management apparatus, address information that associates, for each one of a plurality of request source terminals, request source terminal identification information for identifying the request source terminal configured to request starting communication with at least one candidate counterpart terminal, and candidate counterpart terminal identification information for identifying the at least one candidate counterpart terminal; receiving, in the memory, connection request information from a transmission terminal as the request source terminal; determining, using processing circuitry, whether to provide status information of the transmission terminal of another transmission management apparatus, based on information of the another transmission management apparatus associated with the at least one candidate counterpart terminal included in the address information of the transmission terminal, to generate a determination result when the receiver receives the connection request information; providing, using the processing circuitry, the status information of the transmission terminal of the another transmission management apparatus based on the determination result; and acquiring, using the processing circuitry, status information of the at least one candidate counterpart terminal managed by the another transmission management apparatus included in the address information of the transmission terminal for notifying the transmission terminal when the transmission management apparatus provides the status information of the transmission terminal of the another transmission management apparatus.

BRIEF DESCRIPTION OF THE DRAWINGS

FIG. 7 is a configuration diagram illustrating an example of a relay apparatus management table according to an embodiment;

FIG. 8 is a configuration diagram illustrating an example of a session management table according to an embodiment;

FIGS. 9A and 9B are configuration diagrams illustrating an example of an address list management table according to an embodiment;

FIG. 10 is a configuration diagram illustrating an example of a service management table according to an embodiment;

FIG. 11 is a configuration diagram illustrating an example of an authentication management table according to an embodiment;

FIG. 12 is a configuration diagram illustrating an example of a terminal type management table according to an embodiment;

FIG. 13 is a configuration diagram illustrating an example of an ID management table according to an embodiment;

FIGS. 18A and 18B show a sequence diagram illustrating an example of a process from login to display of an address list for a mobile terminal according to an embodiment;

FIG. 21 is a sequence diagram illustrating an example of a process of communication initiation among a plurality of communication terminals according to an embodiment.

DETAILED DESCRIPTION

[Overall Configuration]

Figure 1:
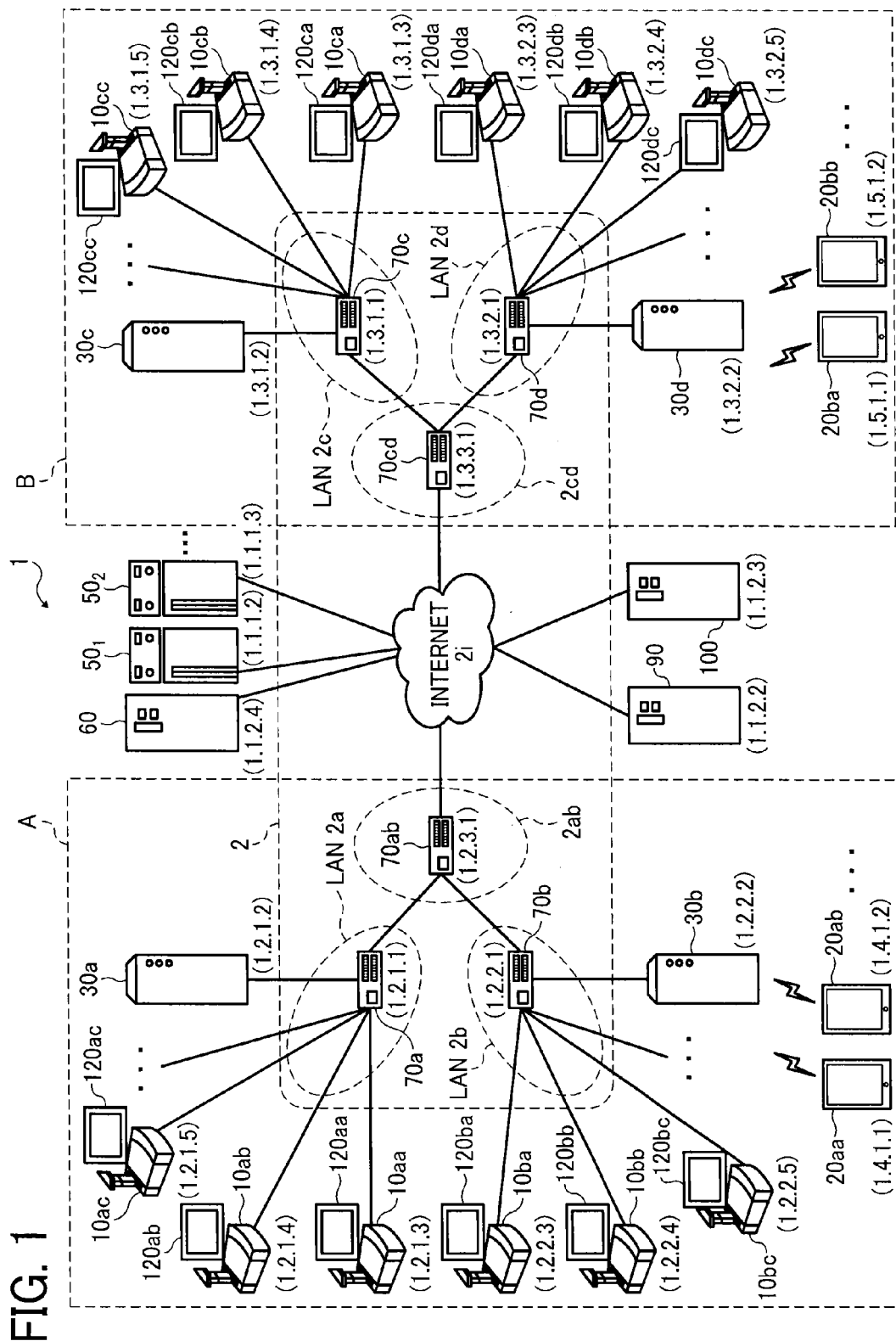
FIG. 1 is a schematic block diagram illustrating an example of a transmission system according to an embodiment.

FIG. 1 is a schematic diagram illustrating an example of a transmission system according to an embodiment. There are various types of transmission systems. One example may be a data providing system. In a data providing system, content data are transmitted from one terminal to another terminal via a transmission management system in a one-way direction.

Another example may be a communication system. Such a communication system may be utilized for mutually exchanging information or emotional expressions among the two or more communication terminals (i.e., the transmission terminals) via a communication management system (i.e., the transmission management system). Examples of such a communications system may include a video conference system, a videophone system, an audio conference system, a voice-call system, a personal computer screen sharing system, and a text chat system.

The following embodiments describe a transmission system by considering a video conference system and a text chat system as an example of a communications system. Thus, the communication system of the following described embodiments is a transmission system that may be configured to provide video conference services and text chat services. Further, the following embodiments describe the transmission management system by considering a video conference management system or a text chat management system as an example of the communication management system. Further, the following embodiments describe a transmission terminal by considering a terminal that utilizes a video conference and/or a text chat as an example of the communication terminal.

That is, the transmission terminal and the transmission management system described according to one or more embodiments may be applied not only to the transmission system itself, but may also be applied to other communication systems or data providing systems.

As illustrated in FIG. 1, the transmission system 1 includes two or more transmission terminals ($10aa$, $10ab$, ..., $20aa$, $20ab$, ...), displays ($120aa$, $120ab$, ...) for the transmission terminals ($10aa$, $10ab$, ...), two or more relay apparatuses ($30a$, $30b$, $30c$, $30d$, and $30e$), a plurality of transmission management systems ($50_1$, $50_2$, ...), a common information management apparatus 60, a program providing system 90, and a maintenance system 100.

A plurality of the transmission terminals 10 are configured to transmit and to receive image data and audio data as examples of content data. A plurality of the transmission terminals 10 may be video conference terminals configured to utilize a video conference service.

In the following, a case where at least one of the plurality of the transmission terminals 10 is a video conference terminal is further described. For example, the at least one of the plurality of the transmission terminals 10 is referred to hereinafter as one or more video conference terminals 10. The video conference terminals 10 are managed by a transmission management system $50_1$ that manages a session control of the video conference service. Note that one or more of the video conference terminals 10 may be a general-purpose terminal, which is installed an application for utilizing the video conference service even if the terminal does not have dedicated hardware for a video conference.

Further, in a case where the communication management system is an audio conference system or a voice-call system, the communication system may transmit and receive voice data as an example of content data for utilizing a voice-call service.

A plurality of the transmission terminals 20 is configured to transmit and to receive image data, audio data, and text data as examples of content data. A plurality of the transmission terminals 10 are terminals configured to utilize the video conference service or the text chat service. In the following, the case where the transmission terminal 20 is a tablet terminal, a mobile phone, a smartphone, or a general-purpose terminal that utilizes the video conference service and the text chat service is further described. The transmission terminal 20 utilizes at least one of these services, for example, the text chat service. In a case where the transmission terminal 20 utilizes a text chat service, the transmission terminal 20 may not utilize the video conference service, or vice versa. The transmission terminal 20 is connected with the communication network 2, for example, via a wireless network (e.g., mobile phone network, or Wireless Fidelity (Wi-Fi), or BLUETOOTH®, to name a few). The transmission terminal 20 is referenced hereinafter as one or more mobile terminals 20. The mobile terminals 20 are managed by the transmission management system $50_2$ that manages a session control of the text chat service.

In addition, the video conference terminal 10 and the mobile terminal 20, as mentioned above, are examples of the communication terminal. The video conference terminals 10 and the mobile terminals 20 may be dedicated terminals for the above-described communication system, car navigation terminals installed in a car, projectors, interactive white boards, wearable terminals or game-dedicated terminals, or may be general terminals such as personal computers, smart phones, mobile phone terminals, or tablet terminals.

In the following described embodiments, any one of the video conference terminals (10aa, 10ab, . . . ) may be referred to as a "video conference terminal 10," and any one of the mobile terminals (20aa, 20ab, . . . ) may be referred to as a "mobile terminal 20." And, any one of the displays (120aa, 120ab, . . . ) may be referred to as a "display 120," and any one of the relay apparatuses (30a, 30b, . . . ) may be referred to as a "relay apparatus 30." Furthermore, any one of the transmission management systems ($50_1$, $50_2$, . . . ) may be referred to as a "transmission management system 50." Furthermore, the transmission terminals requesting initiation of a video conference or a text chat may be referred to as a "request source terminal." Furthermore, the transmission terminals receiving the request for initiation of a video conference or a text chat may be referred to as a "counterpart terminal."

Communication management information sessions may be established between the request source terminal and the counterpart terminal via the transmission management system 50 for transmitting and receiving various communication management information items in the transmission system 1. Further, content data sessions may be established between the request source terminal and the counterpart terminal via the relay apparatus 30 for transmitting and receiving the content data. Note that the sessions may be established directly between the request source terminal and the counterpart terminal or be established via the transmission management system 50 between the request source terminal and the counterpart terminal when the content data transmitted and received among the terminals is, for example, only text data.

In an exemplary embodiment, in a case where the request source terminal is the video conference terminal 10, the session may be established via the transmission management system $50_1$. On the other hand, in a case where the request source terminal is the mobile terminal 20, the session may be established via the transmission management system $50_2$. Thus, a session control of the video conference terminals 10, which utilizes the video conference service, may be managed by the transmission management system $50_1$. On the other hand, a session control of the mobile terminals 20, which utilizes the text chat service may be managed by the transmission management system $50_2$. Each of the services may have a different transmission management system 50, which controls a session according to an embodiment. Each of the session controls of the transmission terminals may be managed by any one of the transmission management systems 50 corresponding to any one of the services that the transmission terminal utilizes. In the following, the transmission management system $50_1$ may be referred to as a "video conference management system $50_1$." Furthermore, the transmission management system $50_2$ may be referred to as a "text chat management system $50_2$."

The relay apparatus 30 illustrated in FIG. 1 relays the content data among the video conference terminals 10 and/or the mobile terminal 20.

Each of the transmission management systems 50 may be a computer system, which may be implemented by one or more computers, to centrally manage various information such as login information of the terminals 10, 20, the communication state of the terminals 10, 20, address list information, and the communication state of the relay apparatus 30. Therefore, the video conference management system $50_1$ manages various information such as login information of the video conference terminals 10, the communication state of the video conference terminals 10, address list information, and the communication state of the relay apparatus 30. On the other hand, the text chat management system $50_2$ manages various information such as login information of the mobile terminals 20, the communication state of the mobile terminals 20, address list information, and the communication state of the relay apparatus 30. The status information (e.g., communication status) of each transmission terminals is to be provided mutually among the related transmission management systems 50 as will hereinafter be described in detail.

The common information management apparatus 60 is a database (DB) server, which manages information used in common among the transmission management systems 50. Note that the common information management apparatus 60 may be, for example, a storage apparatus (e.g., a network storage apparatus). Further, the common information management apparatus 60 may be included in each of the transmission management systems 50.

Routers (70a, 70b, 70c, 70d, 70d, 70ab, and 70cd) are configured to select optimal paths for the content data. Consistent with the described embodiments, any one of the routers (70a, 70b, 70c, 70d, 70d, 70ab, and 70cd) may be simply referred to as a "router 70."

The program providing system 90 includes a hard disk (HD) 304 described later configured to store programs for a terminal, with which the terminal (i.e., the video conference terminal 10 or the mobile terminal 20) may implement various functions or various methods. Accordingly, the program providing system 90 may transmit such programs for the terminal to the video conference terminal 10 or the mobile terminal 20. Furthermore, the program providing system 90 may transmit different programs for the terminal to each of the video conference terminals 10 and the mobile terminals 20. The program providing system 90 may transmit the program for utilizing the video conference service to the video conference terminal 10. On the other hand, the program providing system 90 may transmit the program for utilizing the text chat service to the mobile terminal 20. Note that the program providing system 90 may transmit the program for utilizing only the text chat service to the mobile terminal 20.

The HD 304 of the program providing system 90 further stores programs for a relay apparatus, with which the relay apparatus 30 may implement various functions or various methods. Accordingly, the program providing system 90 may also transmit such programs for the relay apparatus to the relay apparatus 30. In addition, the HD 304 of the program providing system 90 further stores transmission management programs, with which the transmission management system 50 may implement various functions or various methods.

Accordingly, the program providing system 90 may also transmit such transmission management programs to the management system 50. In addition, the HD 304 of the program providing system 90 further stores information management programs, with which the common information management system 60 may implement various functions or various methods. Accordingly, the program providing system 90 may also transmit such information management programs to the common information management system 50.

The maintenance system 100 may be a computer configured to maintain or manage at least one of the video conference terminal 10, the mobile terminal 20, the relay apparatus 30, the transmission management system 50, the common information management apparatus 60, and the program providing system 90. For example, if the maintenance system 100 is domestically located while the video conference terminal 10, the mobile terminal 20, the relay apparatus 30, the management system 50, the common information management apparatus 60 or the program providing system 90 is located abroad, the maintenance system 100 remotely maintains or manages at least one of the video conference terminal 10, the mobile terminal 20, the relay apparatus 30, the management system 50, the common information management apparatus 60 or the program providing system 90 via a communication network 2. Further, the maintenance system 100 performs maintenance, such as the management of a model number, a manufacturer's serial number, a sales destination, a maintenance inspection, and a failure history, on at least one of the video conference terminal 10, the mobile terminal 20, the relay apparatus 30, the management system 50, the common information management apparatus 60, or the program providing system 90, without utilizing the communication network 2.

The video conference terminals (10*aa*, 10*ab*, 10*ac* . . . ), the relay apparatus 30*a*, and the router 70*a* are connected via a LAN 2*a* so that they may communicate with one another. Further, the video conference terminals (10*ba*, 10*bb*, 10*bc* . . . ), the relay apparatus 30*b*, and the router 70*b* are connected via a LAN 2*b* so that they may communicate with one another. Further, the LAN 2*a* and LAN 2*b* are set up in a predetermined region A. In the region A, the LAN 2*a* and LAN 2*b* are connected via a dedicated line 2*ab* including the router 70*ab* so that they may communicate with one another. For example, the region A may be Japan, and the LAN 2*a* may be set up in the Tokyo Office, whereas the LAN 2*b* may be set up in the Osaka Office. Further, the mobile terminals (20*aa*, 20*ab* . . . ) are utilized in the region A.

Meanwhile, the video conference terminals (10*ca*, 10*cb*, 10*cc* . . . ), the relay apparatus 30*c*, and the router 70*c* are connected via a LAN 2*c* so that they may communicate with one another. The video conference terminals (10*da*, 10*db*, 10*dc* . . . ), the relay apparatus 30*d* and the router 70*d* are connected via a LAN 2*d* so that they may communicate with one another. Further, the LAN 2*c* and LAN 2*d* are set up in a predetermined region B. In the region B, the LAN 2*c* and LAN 2*d* are connected via a dedicated line 2*cd* including the router 70*cd* so that they may communicate with one another. For example, the region B may be USA, and the LAN 2*c* may be set up in the New York, N.Y. Office, whereas the LAN 2*d* may be set up in the Washington, D.C. Office. Further, the mobile terminals (20*ba*, 20*bb* . . . ) are utilized in the region B.

The region A and the region B may be connected from the respective routers 70*ab* and 70*cd* via the Internet 2*i* so that the region A and the region B are mutually in communication via the Internet 2*i*. Note that the video conference terminal 10 may be connected directly with the internet 2*i* without the dedicated line.

Further, the transmission management system 50, the program providing system 90, and the maintenance system 100 are connected to the video conference terminal 10, the mobile terminal, the relay apparatus 30, and the common information management apparatus 60 via the Internet 2*i* so that they may communicate with one another. The transmission management system 50, the common information management apparatus 60, the program providing system 90 and the maintenance system 100 may be located in the region A or the region B, or may be a region other than the regions A and B.

Consistent with an embodiment, the communication network 2 is made up of the LAN 2*a*, the LAN 2*b*, the dedicated line 2*ab*, the Internet 2*i*, the dedicated line 2*cd*, the LAN 2*c* and the LAN 2*d*. In the communication network 2, the communications are typically carried out via the wires, but may partially carried out wirelessly (e.g., Wi-Fi, BLUETOOTH®, etc.).

In FIG. 1, the set of four numerals located beneath each of the video conference terminal 10, the mobile terminal 20, the relay apparatus 30, the transmission management system 50, the common information management apparatus 60, the router 70, the program providing system 90, and the maintenance system 100 simply indicates an exemplary internet protocol (IP) address of the typical IPv4. For example, the IP address for the video conference terminal 10*aa* is "1.2.1.3," as illustrated in FIG. 1. The IP addresses may be IPv6; however, consistent with an embodiment, IPv4 is used for simplifying the illustration.

Each of the video conference terminals 10 or the mobile terminals 20 may be used for a call in the same room, a call between indoors and outdoors, and a call between outdoors and outdoors as well as a call between a plurality of business offices and a call between different rooms within the same business office. When each of the video conference terminals 10 or the mobile terminals 20 is used outdoors, wireless communication may be performed, for example, through a cellular phone communication network.

[Hardware Configuration]

Next, the hardware configuration of an exemplary embodiment is described.

[Video Conference Terminal]

Figure 2:
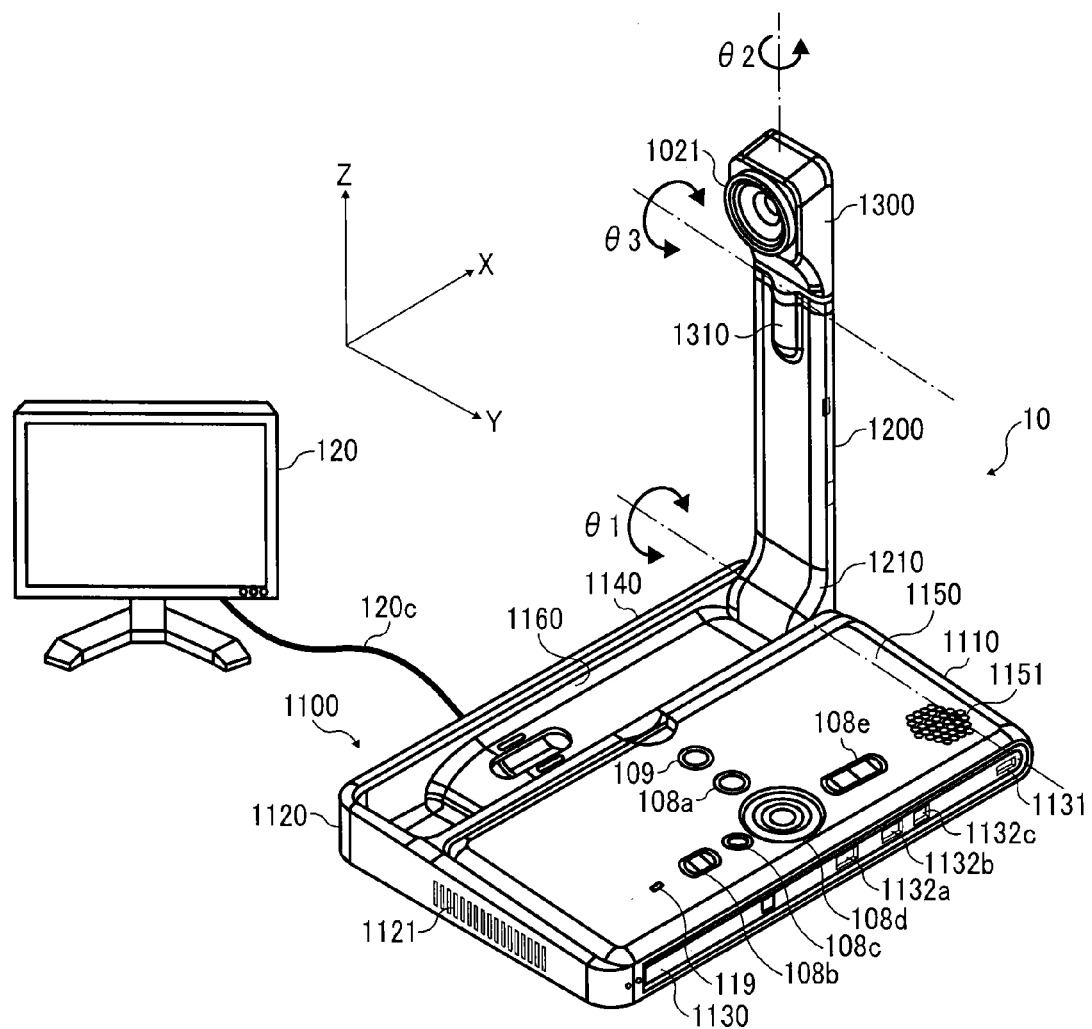
FIG. 2 is an external diagram illustrating an example of a video conference terminal according to an embodiment.

FIG. 2 is an external diagram illustrating the video conference terminal 10 according to an embodiment. Hereinafter, the depicted X-axis direction represents a longitudinal direction of the video conference terminal 10, the depicted Y-axis direction represents a direction perpendicular to the X-axis direction in a horizontal plane, and the depicted Z-axis direction represents a direction perpendicular to the X-axis direction and the Y-axis direction (i.e., vertical direction).

As illustrated in FIG. 2, the video conference terminal 10 includes a case 1100, an arm 1200, and a camera housing 1300. A front-wall face 1110 of the case 1100 may include a not-illustrated air-intake face formed of air-intake holes; and a rear-wall face 1120 of the case 1100 may include an exhaust face 1121 formed of exhaust holes. Accordingly, the video conference terminal 10 may take in external air via the air-intake face and exhaust the air via the exhaust face 1121 by driving a not-illustrated cooling fan optionally arranged inside the case 1100. A right-wall face 1130 of the case 1100 may include a sound collecting hole 1131, via which a built-in microphone 114 (described later with reference to FIG. 3) is capable of picking up audio sounds, such as voice, other sounds, or noise.

The right-wall face 1130 of the case 1100 may include an operations panel 1150. The operations panel 1150 may include operations buttons (108*a* to 108*e*), a later-described power switch 109, a later-described alarm lamp 119, and a sound output face 1151 formed of sound output holes for outputting sound from a later-described built-in speaker 115. Further, a left-wall face 1140 of the case 1100 may include a recessed seating unit 1160 for accommodating an arm 1200 and an operations panel 1200. The right-wall face 1130 of the case 1100 may further include connecting ports (1132a to 1132c) for electrically connecting cables to a later-described external device connecting external device I/F 118. The left-wall face 1140 of the case 1100 may further include a not-illustrated connecting port for electrically connecting a display cable 120c cable to the later-described external device connecting external device I/F 118.

Note that hereinafter, any one of the operations buttons (108a to 108e) may be called an "operations button 108" and any one of the connecting ports (1132a to 1132c) may be called a "connecting port 1132."

Next, the arm 1200 may be attached to the case 1100 via a torque hinge 1210, such that the arm 1200 moves in upward and downward directions within a tilt-angle θ1 range of about 135 degrees with respect to the case 1100. The arm 1200 illustrated in FIG. 2 is arranged at an exemplary tilt-angle θ1 of 90 degrees.

The camera housing 1300 includes a built-in camera 1021 configured to take images of a user, documents, a room, and the like. The camera housing 1300 further includes a torque hinge 1310. The camera housing 1300 is attached to the arm 1200 via the torque hinge 1310. The camera housing 1300 is rotationally attached to the arm 1200 in the upward and downward directions via the torque hinge 1310, such that the camera housing 1300 moves in a pan-angle θ2 range of ±180 degrees and a tilt-angle θ3 range of about ±45 degrees based on the pan and tilt angles illustrated in FIG. 2.

In addition, one of the video conference terminals 10 according to an embodiment, as mentioned above, is an example of the communication terminal. The video conference terminals 10 may be dedicated terminals for the above-described communication system, car navigation terminals installed in a car, projectors, interactive white boards, wearable terminals or game-dedicated terminals, or may be general terminals such as personal computers, smart phones, mobile phone terminals, or tablet terminals.

Note that the external appearance of the mobile terminal 20 may be similar to a typical smartphone, tablet computer, mobile phone, and their descriptions are therefore omitted. Further, external appearances of the relay apparatus 30, the transmission management system 50, the common information management apparatus 60, the program providing system 90, and the maintenance system 100 may be similar to a typical server computer, and their descriptions are therefore also omitted.

Figure 3:
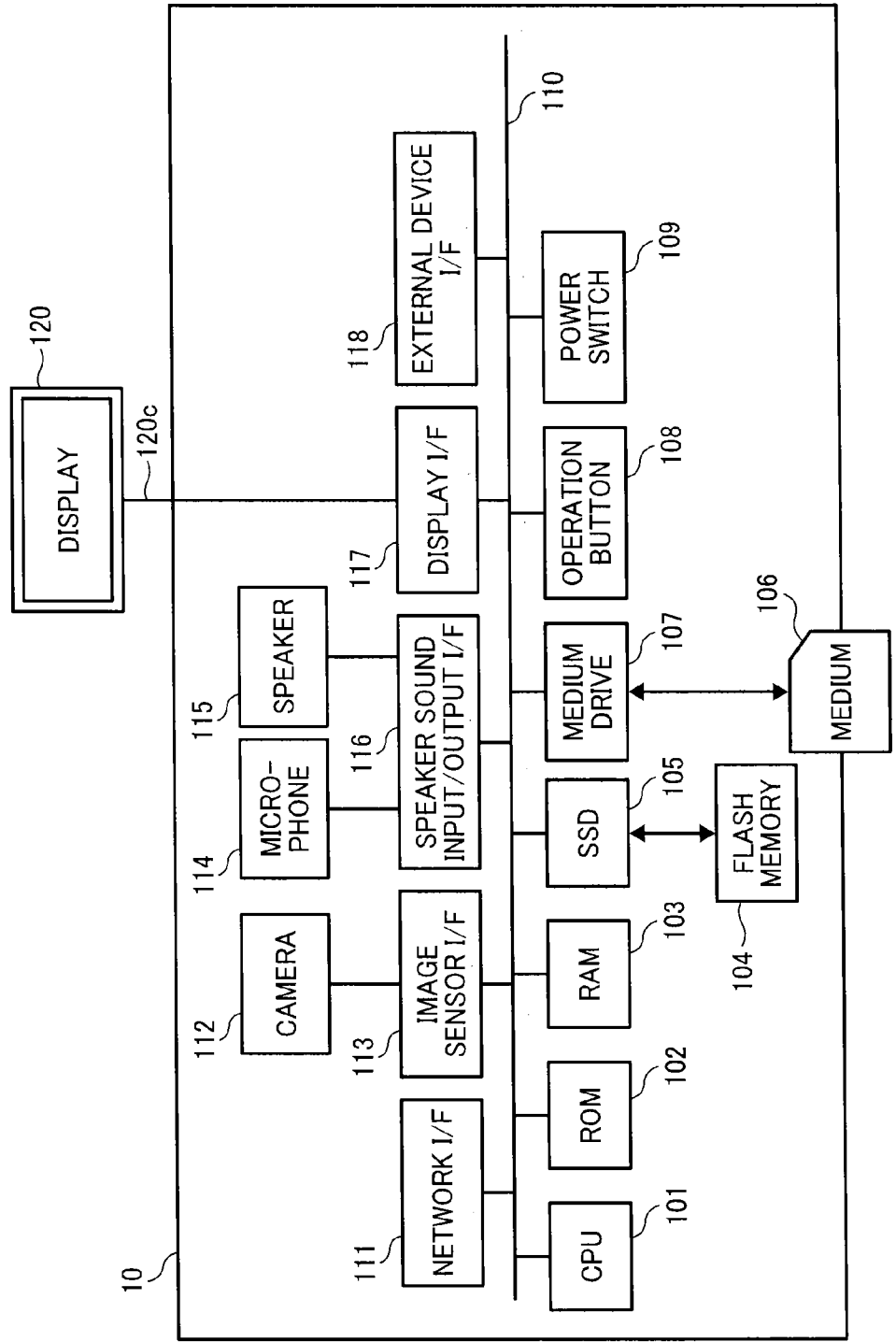
FIG. 3 is a block diagram illustrating an example of a hardware configuration of a video conference terminal according to an embodiment.

Next, the hardware configuration of the video conference terminal 10 is described. FIG. 3 is a hardware configuration diagram illustrating the video conference terminal (i.e., transmission terminal) 10 according to an embodiment. As illustrated in FIG. 3, the video conference terminal 10 includes a central processing unit (CPU) 101 configured to control overall operations of the video conference terminal 10, a read-only memory (ROM) 102 storing programs for the terminal, a random access memory (RAM) 103 utilized as a work area of the CPU 101, a flash memory 104 configured to store programs for the terminal and various data such as image data or audio data, a solid-state drive (SSD) 105 configured to control retrieval and writing (storing) of the various data in the flash memory 104 and the like based on control by the CPU 101, a media drive 107 configured to control retrieval and writing (storing) of data into a recording medium 106 such as a flash memory, the operations button 108 operated by a user, e.g., for selecting an address of the video conference terminal 10, the power switch 109 for switching ON/OFF of the power of the video conference terminal 10, and an external device I/F 118 for transmitting data utilizing the communication network 2.

The video conference terminal 10 further includes a built-in camera 112 configured to image a subject based on control by the CPU 101, an image sensor I/F 113 configured to control driving of the camera 112, a built-in microphone 114, which receives an audio input, a built-in speaker 115, which outputs sound, a sound input/output I/F 116 that processes inputting/outputting of a sound signal between the microphone 114 and the speaker 115 under control of the CPU 101, a display I/F 117 configured to transmit image data to the external display 120 based on control by the CPU 101, the external device connecting external device I/F 118 configured to connect various external devices to the connecting ports (1132a to 1132c) illustrated in FIG. 2, the alarm lamp 119 (see FIG. 2) configured to inform the user of various functional problems of the terminal 10, and a bus line 110 such as an address bus or a data bus for electrically connecting the elements and devices with one another illustrated in FIG. 3 via the bus line 110.

The display 120 is a display unit, such as a liquid crystal or an organic electro-luminescent (EL) material configured to display images, e.g., of the subject or icons, for operating the video conference terminal 10. Further, the display 120 is connected to the display I/F 117 via the cable 120c (see FIG. 2). The cable 120c may be an analog RGB (VGA) cable, a component video cable, a HIGH-DEFINITION MULTIMEDIA INTERFACE® (HDMI®) cable, or a digital video interface (DVI®) cable.

The camera 112 includes one or more lenses and one or more solid-state image sensors configured to convert light into electric charges to produce digital images (videos) of the subject. Examples of the solid-state image sensor include a complementary metal oxide semiconductor (CMOS) or a charge-coupled device (CCD).

The external device connecting external device I/F 118 may be connected via a universal serial bus (USB) with external devices such as an external camera, an external microphone, and an external speaker. On connecting an external camera to the external device I/F 118 via the USB, the external camera is driven in priority to the built-in camera 112. Likewise, on connecting the external microphone or external speaker to the external device I/F 118 via the USB, the external microphone or external speaker is driven in priority to the built-in microphone 114 or the built-in speaker 115. Note that the video conference terminal 10 may be connected with only the external camera via the external device I/F 118 instead of the built-in camera 112. Further, the video conference terminal 10 may be connected with only the external microphone or the external speaker via the external device I/F 118 instead of the built-in microphone 114 or the built-in speaker 115. Further, the display 120 of the video conference terminal 10 may be the built-in display.

In addition, the video conference terminal 10 may have an external storage medium I/F for reading an external storage medium (e.g., a Subscriber Identity Module (SIM) card, Secure Digital (SD) memory card).

Note that the recording medium 106 is removable from the video conference terminal 10. In addition, if the recording medium 106 is a non-volatile memory configured to retrieve or write data based on control by the CPU 101, the recording medium 106 is not limited to the flash memory 104, and may be an electrically erasable and programmable ROM (EEPROM).

Further, the aforementioned programs for the terminal may be recorded in an installable format or in an executable format on a computer-readable recording medium such as the recording medium 106 to distribute such a program or programs. Further, the aforementioned programs for the terminal may be stored in the ROM 102 instead of the flash memory 104.

[Mobile Terminal]

Figure 4:
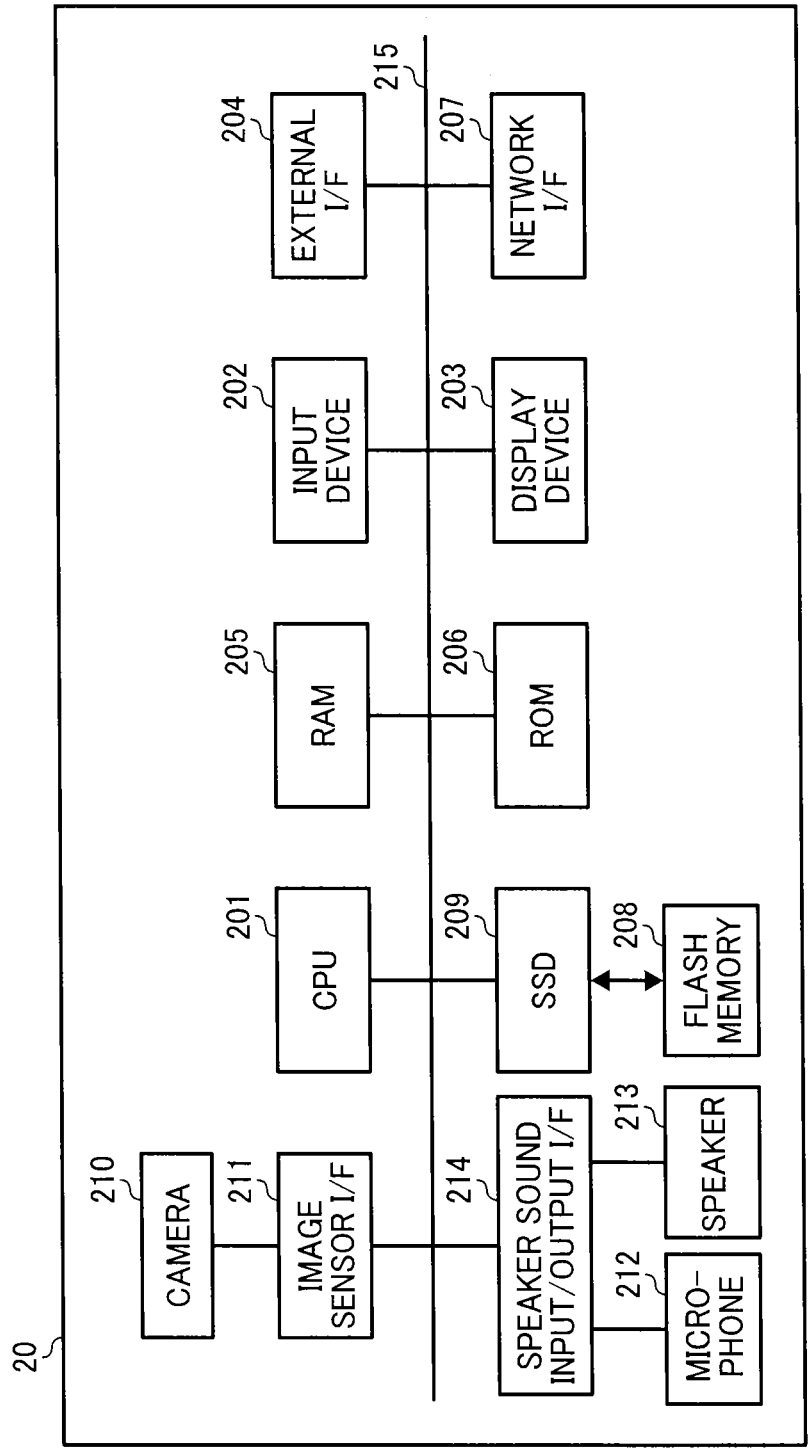
FIG. 4 is a block diagram illustrating an example of a hardware configuration of a mobile terminal according to an embodiment.

FIG. 4 is a hardware configuration diagram illustrating an example of the mobile terminal (i.e., transmission terminal) 20 according to an embodiment. As illustrated in FIG. 4, the mobile terminal 20 includes a central processing unit (CPU) 201 configured to control overall operations of the mobile terminal 20, an input device 202, a display device 203 for displaying processing results by the mobile terminal 20, an external interface (I/F) 204 configured to connect various external devices to the connecting a random access memory (RAM) 205 utilized as a work area of the CPU 201, a read-only memory (ROM) 206 storing programs and data related to configuration of an operating system (OS) and a network, a network interface (I/F) 207 for transmitting data utilizing the communication network 2 (e.g., mobile phone communication network), a flash memory 208 configured to store programs for the terminal and various data, a solid-state drive (SSD) 209 configured to control retrieval and writing (storing) of the various data in the flash memory 208 and the like based on the control of the CPU 201.

The mobile terminal 20 further includes the built-in camera 210 configured to image a subject based on the control of the CPU 201, an image sensor I/F 211 configured to control driving of the camera 210, a built-in microphone 212, which receives an audio input, a built-in speaker 213, which outputs sound, a sound input/output I/F 214 that processes inputting/outputting of a sound signal between the microphone 212 and the speaker 213 under control of the CPU 201, and a bus line 215 such as an address bus or a data bus for electrically connecting the elements and devices with one another illustrated in FIG. 4 via the bus line 215. In the case that the mobile terminal 20 is for only text chat, the camera 210, the microphone 212 or the speaker 213 may not be included in the mobile terminal 20. Note that the camera 210, the microphone 212, and the speaker 213 need not necessarily be included in the mobile terminal 20, and the mobile terminal 20 may be configured to be capable of connecting only an external camera, an external microphone, and an external speaker.

In addition, if the recording medium is a non-volatile memory configured to retrieve or write data based on the control of the CPU 201, the recording medium is not limited to the flash memory 208, and may be an EEPROM.

Further, the aforementioned programs for the terminal may be recorded in an installable format or in an executable format on a computer-readable recording medium such as the recording medium to distribute such a recording medium. Further, the aforementioned programs for the terminal may be stored in the ROM 206 instead of the flash memory 208.

[Relay Apparatus, Transmission Management Apparatus, Common Information Management Apparatus, Program Providing System, Maintenance System]

Figure 5:
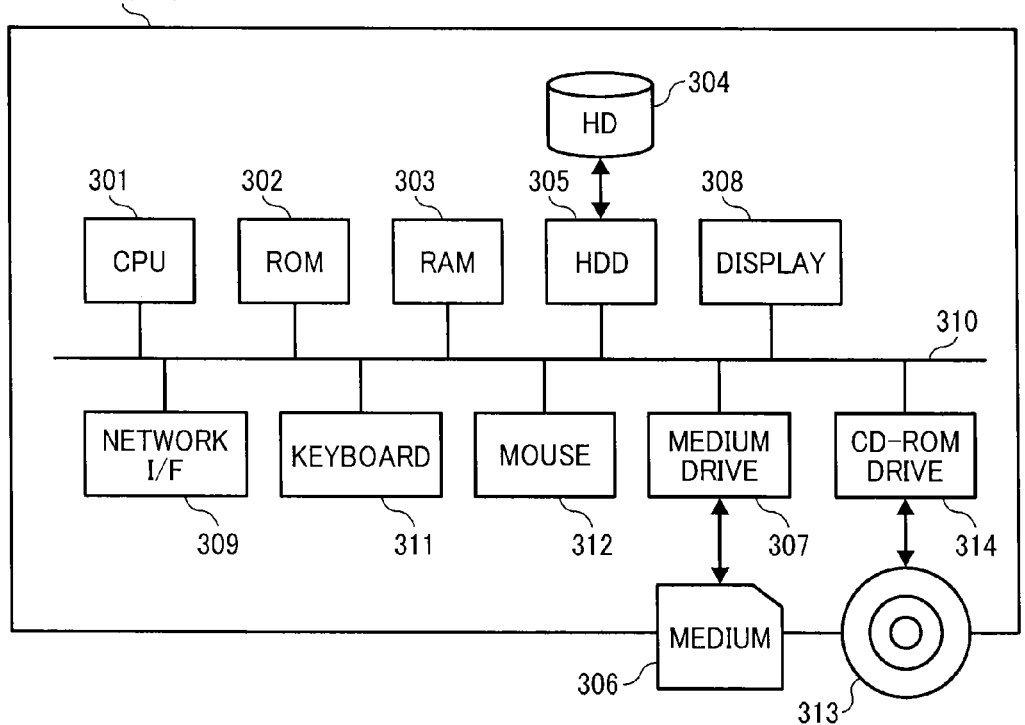
FIG. 5 is a hardware configuration diagram illustrating a relay apparatus, a transmission management system, a common information management apparatus, a program providing system, or a maintenance system in the transmission system according to an embodiment.

Next, the hardware configuration of the relay apparatus 30, the transmission management system 50, the common information management apparatus 60, the program providing system 90, and the maintenance system 100 is described. FIG. 5 is a hardware configuration diagram illustrating the relay apparatus 30, the transmission management system 50, the common information management apparatus 60, the program providing system 90, and the maintenance system 100 according to an embodiment.

The transmission management system 50 includes a central processing unit (CPU) 301 configured to control overall operations of the transmission management system 50, a read only memory (ROM) 302 storing programs for the transmission management, a random access memory (RAM) 303 utilized as a work area of the CPU 301, a hard disk (HD) 304 configured to store various data, a hard disk drive (HDD) 305 configured to control retrieval and writing (storing) of the various data in the HD 304 based on the control of the CPU 301, a media drive 307 configured to control retrieval and writing (storing) of data into a recording medium 306 such as a flash memory, a display 308 configured to display various information such as a cursor, menus, windows, characters and images, a network I/F 309 for transmitting data utilizing the later-described communication network 2, a keyboard 311 including plural keys for inputting the characters, numerals, and various instructions, a mouse 312 for selecting or executing various instructions, selecting items to be processed, and moving the cursor, a CD-ROM drive 314 configured to control retrieval or writing of data in the compact disk read-only memory (CD-ROM) 313 as an example of a removable recording medium, and a bus line 310 such as an address bus or a data bus for electrically connecting the elements and devices with one another illustrated in FIG. 5 via the bus line 310.

In this case, the programs aforementioned for the transmission management may also be recorded in an installable format or in an executable format on a computer-readable recording medium such as the recording medium 306 or the CD-ROM 313 to distribute such a recording medium. Further, the aforementioned programs for the transmission management may be stored in the ROM 302 instead of the HD 304.

In addition, since the relay apparatuses 30 have a hardware configuration that is the same as or similar to that of the above-described transmission management system 50, a description thereof is omitted. Note that the HD 304 stores a relay apparatus program for controlling the relay apparatuses 30. Also in this case, the relay apparatus program may be stored in a file in an installable format or an executable format on a computer-readable recording medium such as the recording medium 306 or the CD-ROM 313 and distributed. In addition, the relay apparatus program may be stored on any desired memory such as the ROM 302, instead of the HD 304. Further, since the common information management apparatus 60 has a hardware configuration that is the same as or similar to that of the above-described transmission management system 50, a description thereof is omitted. Note that the HD 304 stores an information management program for controlling the common information management apparatus 60. Also in this case, the information management program may be stored in a file in an installable format or an executable format on a computer-readable recording medium such as the recording medium 306 or the CD-ROM 313 and distributed. In addition, the information management program may be stored on any desired memory such as the ROM 302, instead of the HD 304. In addition, since the program providing system 90 and the maintenance system 100 each have a hardware configuration that is the same as or similar to that of the above-described transmission management system 50, descriptions thereof are omitted. Note that the HD 304 stores a program providing program for controlling the program providing system 90. Also in this case, the program providing program may be recorded in a file in an installable format or an executable format on a computer-readable recording medium such as the recording medium 306 or the CD-ROM 313 and distributed. In addition, the program providing program may be stored on any desired memory such as the ROM 302, instead of the HD 304. In addition, the same applies to the maintenance system 100 and a maintenance program.

Note that other examples of the removable recording medium include a compact disc recordable (CD-R), a digital versatile disk (DVD®), and a BLU-RAY DISC® (BD).

[Functional Configuration of Embodiment]

Figure 6:
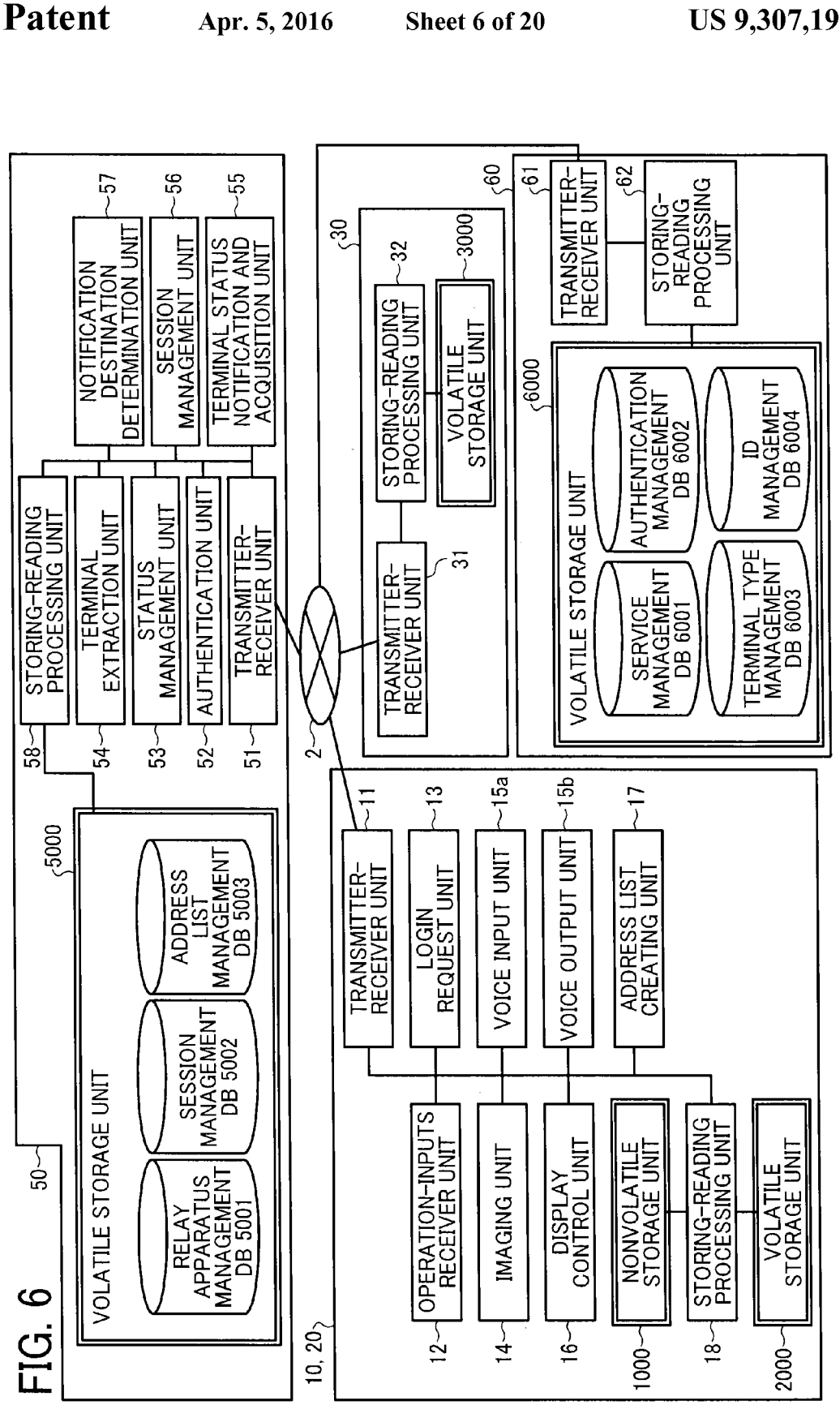
FIG. 6 is a block diagram illustrating terminals, apparatuses, and systems of a transmission system according to an embodiment.

Next, a functional configuration of an embodiment is described. FIG. 6 is a functional block diagram illustrating each of the terminals, the apparatuses, and the systems according to an embodiment. As illustrated in FIG. 6, the video conference terminal 10, the mobile terminal 20, the relay apparatus 30, the transmission management system 50, and the common information management apparatus are connected via the communication network 2 such that they carry out data communications with one another via the communication network 2.

[Functional Configuration of Terminal]

The video conference terminal 10 and the mobile terminal 20 include a transmitter-receiver unit 11, an operation-inputs receiver unit 12, a login request unit 13, an imaging unit 14, a sound input unit 15a, a voice output unit 15b, a display control unit 16, an address list creating unit 17, and a storing-reading processing unit 18. The following, the case where the transmission terminal illustrated in FIG. 5 is the video conference terminal 10 is described.

The above units represent functions and units implemented by any of the elements and devices illustrated in FIG. 3, which are activated by instructions from the CPU 101 based on the programs for the terminal developed on the RAM 102 from the flash memory 104. Further, the video conference terminal 10 further includes a volatile storage unit 2000 formed of the RAM 103 illustrated in FIG. 3, and a nonvolatile storage unit 1000 formed of the flash memory 104 illustrated in FIG. 3.

Next, the functional units of the video conference terminal 10 are described in more detail with reference to FIG. 3 and FIG. 5. Note that in the following description, the functions of the video conference terminal 10 are illustrated in association with the main elements and devices for implementing the units of the video conference terminal 10 illustrated in FIG. 3.

The function of the transmitter-receiver unit 11 of the video conference terminal 10 illustrated in FIG. 5 may be implemented by instructions from the CPU 101 and the network I/F 111 illustrated in FIG. 3. The transmitter-receiver unit 11 transmits various data or information to other terminals, apparatuses, or systems and receives various data or information from other terminals, apparatuses, or systems via the communication network 2. The transmitter-receiver unit 11 starts receiving status information of each of candidate counterpart terminals from the video conference management system $50_1$ before initiating communication with desired counterpart terminals. Note that the status information not only includes an operating status (online or offline status), but also includes a detailed status such as engaging or waiting status during the video conference terminal 10 (or/and mobile terminal 20) being online. The status information further includes various statuses in addition to the operating status of the video conference terminal 10 (or/and mobile terminal 20), examples of which include a status of disconnected cables from the video conference terminal 10, a status of incapability of outputting images while outputting sound, and a mute status of incapability of outputting sound. The following example illustrates a case where the status information is the operating status. Further, in the case where the transmission terminal illustrated in FIG. 5 is the mobile terminal 20, the transmitter-receiver unit 11 receives each status information indicating each terminal status of the candidate counterpart terminals from the text chat management system $50_2$ before initiation for communicating with the desired counterpart terminal.

The operation-inputs receiver unit 12 is configured to receive various inputs from the user, and such a function of the operation-inputs receiver unit 12 is implemented by instructions from the CPU 101 and the operations button 108 and the power switch 109 illustrated in FIG. 3. For example, when the user switches ON the power switch 109 in FIG. 3, the operation-inputs receiver unit 12 illustrated in FIG. 5 receives a power-ON signal to switches ON the power of the video conference terminal 10. Note that, in the case where the transmission terminal illustrated in FIG. 5 is the mobile terminal 20, such a function of the operation-inputs receiver unit 12 is implemented by instructions from the CPU 201 and the input device 202.

The login request unit 13 is configured to automatically transmit login request information indicating that the user desires to login, and a current IP address of the video conference terminal 10 as an IP address of a request source terminal from the transmitter-receiver unit 11 to the video conference management system $50_1$ via the communication network 2 when the power-ON signal is received by the operation-inputs receiver unit 12 as a trigger. Such a function of the login request unit 13 is implemented by instructions received from the CPU 101 illustrated in FIG. 3. On the other hand, when the user switches OFF the power switch 109, the transmitter-receiver unit 11 transmits power off status information to the video conference management system $50_1$, and the operation-inputs receiver unit 12 subsequently turns OFF the power of the video conference terminal 10 completely. Accordingly, the video conference management system $50_1$ may detect a power status of the video conference terminal 10 as an OFF status.

The imaging unit 14 is configured to take an image of a subject and output image data of the subject, and such a function of the imaging unit 14 is implemented by instructions received from the CPU 101 illustrated in FIG. 3, and also by the camera 112 and the image sensor I/F 113 also illustrated in FIG. 3.

The sound input unit 15a is configured to input audio data of the audio signal obtained by the microphone 114 that converts voice of the user into the audio signal, and such a function of the sound input unit 15a is implemented by the audio input/output I/F 116 illustrated in FIG. 3.

The operations or functions of the sound output 15b of the terminal 10 are performed by the sound I/O I/F 116 according to an instruction received from the CPU 101 illustrated in FIG. 3, in cooperation with the speaker 115. The sound output 15b outputs a sound signal of sound data that is received from the counterpart terminal 10 through the speaker 115.

The display control unit 16 is configured to control transmission of the image data to the external display 120, and such a function of the display control unit 16 may be implemented by the network I/F 117 illustrated in FIG. 3.

The address list creating unit 17 is configured to create and update an address list, which displays statuses of the destination candidates with icons based on the later-described address list information and the status information of the video conference terminal 10 (and/or the mobile terminal 20) as a destination candidate.

The storing-reading processing unit 18 is configured to store various data in a nonvolatile storage unit 1000 or retrieve various data from the nonvolatile storage unit 1000, and such a function of the storing-reading processing unit 18 may be implemented by instructions received from the CPU 101 and also by the SSD 105 illustrated as an example in FIG. 3. The nonvolatile storage unit 1000 stores a communication identification (ID), and a password, and the like for identifying the video conference terminal 10 or the user of the video conference terminal 10 as a transmission destination.

The storing-reading processing unit 19 is configured to further store various data in the volatile storage unit 2000 and retrieve various data from the volatile storage unit 2000. The storing-reading processing unit 19 overwrites the image data and the audio data in the volatile storage unit 2000 with new ones received from the counterpart terminal every time the video conference terminal 10 talks to the counterpart terminals. Note that the display 120 displays previous image data before being overwritten with the new image data and the speaker 115 outputs previous audio data before being overwritten with the new audio data.

Note that the communication ID and the later-described relay apparatus ID individually indicate identification information formed of language, characters, and various symbols that uniquely identify the transmission terminal or the user of the transmission terminal and the relay apparatus. The communication ID and the relay apparatus ID may be the identification information formed of a combination of two or more of the languages, characters, and various symbols.

[Functional Configuration of Relay Apparatus]

The relay apparatus 30 includes a transmitter-receiver unit 31 and a storing-reading processing unit 32. The above units represent functions and units implemented by any of the elements and devices illustrated in FIG. 5, which are activated by instructions from the CPU 301 based on the programs for the relay apparatus developed on the RAM 302 from the HD 304. Further, the relay apparatus 30 further includes a nonvolatile storage unit 3000 formed of the HD 304 illustrated in FIG. 4, which is capable of maintaining the various data or information even when the power of the relay apparatus 30 is turned off.

Next, the functional units of the relay apparatus 30 is described in more detail. Note that in the following description, the functions of the relay apparatus 30 are illustrated in association with the main elements and devices for implementing the units of the relay apparatus 30 illustrated in FIG. 5.

The transmitter-receiver unit 31 of the relay apparatus 30 is configured to transmit various data (information) to and receive such data from other terminals, relay apparatuses and systems. The function of the transmitter-receiver unit 31 may be implemented by instructions received from the CPU 301 and the network I/F 309 illustrated in FIG. 5.

The storing-reading processing unit 39 is configured to store various data in the nonvolatile storage unit 3000 and retrieve various data from the nonvolatile storage unit 3000. The function of the storing-reading processing unit 39 may be implemented by instructions received from the CPU 301 and the HDD 205 illustrated in FIG. 5.

[Functional Configuration of Transmission Management System]

The transmission management system 50 includes a transmitter-receiver unit 51 (an example of a receiver unit, an example of a transmitter request, etc.), an authentication unit 52, a status management unit 53, a terminal extraction unit 54, a terminal status notification and acquisition unit 55, a session management unit 56, a notification destination determination unit 57, and a storing-reading processing unit 58. The above units represent functions and units implemented by any of the elements and devices illustrated in FIG. 5, which are activated by instructions from the CPU 301 based on the programs for the management system developed on the RAM 202 from HD 304. Further, the transmission management system 50 further includes a nonvolatile storage unit 5000 formed of the HD 304 illustrated in FIG. 4, which is capable of maintaining the various data or information even when the power of the transmission management system 50 is turned off.

[Relay Apparatus Management Table]

The nonvolatile storage unit 5000 includes a relay apparatus management DB 5001 formed of a relay apparatus management table illustrated in FIG. 7. In the relay apparatus management table, the relay apparatus IDs of the relay apparatuses 30 are associated with the operating statuses of the relay apparatuses 30, receipt time and dates at which the status information indicating the operating statuses of the relay apparatuses 30 are received by the transmission management system 50, the IP addresses of the relay apparatuses 30, and the maximum data transmission speeds (e.g., in units of Mbps) of the relay apparatuses 30. For example, in the relay apparatus management table illustrated in FIG. 7, the relay apparatus 30*a* having the relay apparatus ID "111*a*" is associated with the operating status "ONLINE," the receipt time and date "2013.11.10.13:00" (i.e., 13:00, Nov. 10, 2013) at which status information of the relay apparatus 30*a* is received by the transmission management system 50, the IP address "1.2.1.2" of the relay apparatus 30*a*, and the maximum data transmission speed 100 Mbps of the relay apparatus 30*a*. Each of transmission management systems 50 manages the available relay apparatus 30. For example, the video conference management system 50$_1$ manages a relay apparatus management table for the video conference service. On the other hand, the text chat management system 50$_2$ manages a relay apparatus management table for the text chat service. In the text chat service, the session may be established directly between the request source terminal and the counterpart terminal or be established via the transmission management system 50 between the request source terminal and the counterpart terminal. Note that the relay apparatus management DB 5001 and the later-described session management DB 5002 may be included in the common information management apparatus. Each of the transmission management systems 50 is able to utilize information stored in the relay apparatus management table and the session management table in common.

[Session Management Table]

The nonvolatile storage unit 5000 includes a session management DB 5002 formed of a session management table illustrated in FIG. 8. In the session management table, session IDs that identify sessions in which the communication data are transmitted and received between the terminals for selecting the relay apparatus 30 are associated with the relay apparatus IDs of the relay apparatuses 30 utilized for relaying the content data, the communication ID of the request source terminal, the communication terminal IDs of the counterpart terminals. For example, in the session management table illustrated in FIG. 8, the relay apparatus 30*a*(having the relay apparatus ID "111*a*") selected for executing the session having the session ID "se1" is associated with the request source terminal 02*aa* (the mobile terminal 02*aa*) having the communication ID "02*aa*" that has a data communication with the counterpart terminal (the video conference terminal 10*ab*) having the communication ID "01*ab*."

[Address List Management Table]

The nonvolatile storage unit 5000 includes an address list management DB 5003 formed of an address list management table illustrated in FIGS. 9A and 9B. FIG. 9A is an example of the address list management table registered the address information managed by the video conference management system 50$_1$. On the other hand, FIG. 9B is an example of the address list management table registered the address information managed by the text chat management system $50_2$. In the address list management table, communication IDs of registered candidate counterpart terminals are associated with the communication IDs of the request source terminals that request initiation of a videoconference communication or a text chat communication. The communication ID of the counterpart terminal is made up of information of the transmission management system 50, which manages a session control of the counterpart terminal following "@." Each of the communication IDs of the counterpart terminals is associated with the information of the transmission management system 50, which manages the session control for each the counterpart terminal. For example, in the address list management table illustrated in FIG. 9A, the communication ID "01*ab*" of the request source terminal 10*ab* (the video conference terminal 10*ab*) is associated with a candidate counterpart terminal 10*aa* (the video conference terminal 10*aa*) having a communication ID "01*aa*," a candidate counterpart terminal 20*aa* (the mobile terminal 20*aa*) having a communication ID "02*aa*" and the like, which the request source terminal requests to initiate the video conference.

On the other hand, for example, in the address list management table illustrated in FIG. 9B managed by the text chat management system $50_2$, the communication ID "02*aa*" of the request source terminal 20*aa* (the mobile terminal 20*aa*) is associated with a candidate counterpart terminal 20*ab* (the mobile terminal 20*ab*) having a communication ID "02*ab*," a candidate counterpart terminal 10*ab* (the video conference terminal 10*ab*) having a communication ID "01*ab*" and the like, which the request source terminal requests to initiate the video conference service or the text chat service. Note that the request source terminal is not able to request initiation for communication of the service that the counterpart terminal is not able to utilize. For example, the mobile terminal 20*aa* (the communication ID "02*aa*") is not able to request initiation for communication of the text chat service to the counterpart terminal (the communication ID "01*ab*"). On the other hand, the mobile terminal 20*aa* is able to request initiation for communication of the video conference service to the counterpart terminal (the communication ID "01*ab*").

Further, the information following "@" illustrated in FIGS. 9A and 9B may be domain information (domain name) of the transmission management system 50.

Next, functional units of the transmission management system 50 are described. Note that in the following description, the functions of the transmission management system 50 are illustrated in association with the main elements and devices for implementing the units of the transmission management system 50 illustrated in FIG. 5.

The transmitter-receiver unit 51 of the transmission management system 50 is configured to transmit various data (information) to and receive such data from other terminals, relay apparatuses, and systems. The function of the transmitter-receiver unit 51 may be implemented by instructions from CPU 301 and the network I/F 309 illustrated in FIG. 5.

The authentication unit 52 is configured to search the authentication management DB 6002 in the common information management apparatus 60 by the communication ID and a password contained in the login request information as search keys, and authenticate the corresponding terminal or user based on whether the communication ID and the password contained in the login request are identical to those managed in the authentication management table. The function of the authentication unit 52 may be implemented by instructions from CPU 301 and the network I/F 309 illustrated in FIG. 5.

The status management unit 53 is configured to manage the ID management DB 6004 in the common information management apparatus 60 by associating and storing the communication ID the request source terminal that has requested for login with the operating status. The function of the status management unit 53 may be implemented by instructions from CPU 301 and the network I/F 309 illustrated in FIG. 5.

The terminal extraction unit 54 is configured to search the address list management DB 5003 by the communication ID of the request source terminal that has requested for the login as a key, and retrieve the communication IDs of the candidate counterpart terminals capable of communicating with the request source terminal and information of the transmission management system 50 which manages session control of the terminal corresponding to the communication ID. The function of the terminal extraction unit 54 may be implemented by instructions from CPU 301 and the network I/F 309 illustrated in FIG. 5.

The terminal status notification and acquisition unit 55 is configured to search the terminal management table (see FIG. 11) by the terminal IDs of the destination candidate terminals extracted by the terminal extraction unit 54 as search keys, and retrieve the operating statuses of the extracted destination candidate terminals by the terminal IDs of the extracted destination candidate terminals. Thus, the terminal status acquisition unit 55 acquires the operating statuses of the destination candidate terminals capable of communicating with the request source terminal that has requested for the login. Further, the terminal status acquisition unit 55 is configured to search the terminal management table by the terminal IDs of the terminals extracted by the terminal extraction unit 54 as search keys and acquire the operating status of the request source terminal that has requested for the login. The function of the terminal status notification and acquisition unit 55 may be implemented by instructions from CPU 301 and the network I/F 309 illustrated in FIG. 5.

The session management unit 56 is configured to store and manage the session IDs in association with the communication ID of the request source terminal and the communication ID of the counterpart terminal in the session management DB 5002 of the nonvolatile storage unit 5000. Further, the session management unit 56 is configured to store and manage in the session management table the relay apparatus ID of the selected one of the relay apparatuses 30 in association with a corresponding one of session IDs. The function of the session management unit 56 may be implemented by instructions from CPU 301 and the network I/F 309 illustrated in FIG. 5.

The notification determination unit 57 determines the transmission management system 50 for providing the operation status of the request source terminal based on the service name included in the login request information. The function of the notification determination unit 57 may be implemented by instructions from CPU 301 illustrated in FIG. 5. For example, in the case where the mobile terminal 20, which utilize the video conference service logins to the text chat management system $50_2$, the notification determination unit 57 determines whether to provide the operation status of the mobile terminal 20 of the video conference management system $50_1$. Therefore, in the case where each the different services is managed based on the different session control methods, it is able to provide and acquire the status information (e.g., the operation status) of the transmission terminal, which utilizes a plurality of services among the transmission terminals.

The storing-reading processing unit 58 is configured to store various data in the nonvolatile storage unit 5000 and retrieve various data from the nonvolatile storage unit 5000.

The function of the storing-reading processing unit 58 may be implemented by the HDD 305 illustrated in FIG. 5.

[Functional Configuration of Common Information Management Apparatus]

The common information management apparatus 60 includes a transmitter-receiver unit 61 (an example of a receiver unit, an example of a transmitter request, etc.) and a storing-reading processing unit 62. The above units represent functions and units implemented by any of the elements and devices illustrated in FIG. 5, which are activated by instructions from the CPU 301 based on the programs for the information management apparatus developed on the RAM 202 from HD 304. Further, the common information management apparatus 60 further includes a nonvolatile storage unit 6000 formed of the HD 304 illustrated in FIG. 4, which is capable of maintaining the various data or information even when the power of the common information management apparatus 60 is turned off.

[Service Management Table]

The nonvolatile storage unit 6000 includes a service management DB 6001 formed of a service management table illustrated in FIG. 10. In the service management table, service names managed in the transmission system 1 are individually associated with transmission management system names corresponding to the transmission management system 50 which manages the session control of each of the services. For example, in the service management table illustrated in FIG. 10, the session control of the video conference service (the service name is "video conference") is managed by the video conference management system 50₁ (the transmission management system name is "video conference management system"). Further, in the service management table illustrated in FIG. 10, the session control of the text chat service (the service name is "text chat") is managed by the text chat management system 50₂ (the transmission management system name is "text chat management system").

[Authentication Management Table]

The nonvolatile storage unit 6000 includes an authentication management DB 6002 formed of an authentication management table illustrated in FIG. 11. In the authentication management table, passwords are individually associated with the communication IDs of all the transmission terminals (the video conference terminal 10 and the mobile terminal 20) managed by the transmission management system 50. For example, in the authentication management table illustrated in FIG. 11, the communication ID "01aa" of the video conference terminal 10aa is associated with the password "aaaa."

[Terminal Type Management Table]

The nonvolatile storage unit 6000 includes a terminal type management DB 6003 formed of a terminal type management table illustrated in FIG. 12. In the terminal type management table, service names which a terminal of the corresponding terminal type name utilizes are individually associated with the terminal types names of all the transmission terminals in the transmission system 1. For example, it indicates that the terminal of the terminal type name "video conference" utilizes the service of the service name "video conference" on the terminal type name table illustrated in FIG. 12. Further, it indicates that the terminal of the terminal type name "general-purpose" utilizes the services of the service name "video conference" and the service name "text chat." Further, it indicates that the terminal of the terminal type name "text chat" utilizes the services of the service name "text chat."

Note that the terminal type name of the video conference terminal 10 is "video conference" in an embodiment. Further, the terminal type name of the mobile terminal 20 is "general-purpose" in an embodiment. The mobile terminal 20 may be the terminal of the terminal type name "text chat" when the mobile terminal 20 installs the program for only text chat service. Further, the mobile terminal 20 may be the terminal of the terminal type name "video conference" when the mobile terminal 20 installs the program for only video conference service. As mentioned above, the mobile terminal 20 may be the terminal of the difference terminal type name based on the program type for the terminal installed.

[ID Management Table]

The nonvolatile storage unit 6000 includes an ID management DB 6004 formed of an ID management table illustrated in FIG. 13. In the ID management table, communication IDs of the transmission terminals as destination terminals are associated with names of the destination terminals, operating statuses of the destination terminals, notification destinations of the operating status with other terminals, receipt time and dates at which the login request information of the destination terminals is received by the transmission management system 50, and IP addresses of the destination terminals. For example, in the ID management table illustrated in FIG. 13, the video conference terminal 10aa having the communication ID "01aa" is associated with the name "AA VIDEO CONFERENCE TERMINAL" of the video conference terminal 10aa, the operating status "ONLINE (COMMUNICATION OK)" of the video conference terminal 10aa, the notification destination "-" (no registration), the receipt time and date "2013.11.10.13:40" (e.g., "13:40 Nov. 10, 2013") at which the login request information of the video conference terminal 10aa is received by the transmission management system 50 (the video conference management system 50₁), and the IP address "1.2.1.3" of the video conference terminal 10aa. Note that in the case where the notification destination indicates "-" (no registration), the operation status of the transmission terminal is not notified of another transmission management system 50. Thus, the operation status of the transmission terminal is notified of only the transmission management system 50, which receives the login request. In the above case, the operation status of the video conference terminal 10aa is notified of only the transmission management system 50₁ (the video conference management system).

On the other hand, for example, in the ID management table illustrated in FIG. 13, the mobile terminal 20aa having the communication ID "02aa" is associated with the name "AA MOBILE TERMINAL" of the mobile terminal 20aa, the operating status "ONLINE (COMMUNICATION OK)" of the mobile terminal 20aa, the notification destination "VIDEO CONFERENCE MANAGEMENT SYSTEM" of the mobile terminal 20aa, the receipt time and date "2013.11.25.14:30" (e.g., "14:30 Nov. 25, 2013") at which the login request information of the mobile terminal 20aa is received by the transmission management system 50 (the text chat management system 50₂), and the IP address "1.4.1.1" of the mobile terminal 20aa. Note that, in the case where the notification destination has been registered, the operation status of the transmission terminal is notified of another transmission management system 50, which is registered. In the above case, the operation status of the mobile terminal 20aa is notified of the transmission management system 50₁ (the video conference management system). The registered notification destination may be a plurality of notification destinations, for example "video conference management system, XXX management system, . . . ".

Next, functional units of the common information management apparatus 60 are described. Note that in the following description, the functions of the common information management apparatus 60 are illustrated in association with the main elements and devices for implementing the units of the common information management apparatus 60 illustrated in FIG. 5.

The transmitter-receiver unit 61 is configured to transmit various data (information) to and receive such data from other terminals, relay apparatuses, and systems. The function of the transmitter-receiver unit 61 may be implemented by instructions from CPU 301 and the network I/F 309 illustrated in FIG. 5.

The storing-reading processing unit 62 is configured to store various data in the nonvolatile storage unit 6000 and retrieve various data from the nonvolatile storage unit 6000. The function of the storing-reading processing unit 62 may be implemented by the HDD 305 illustrated in FIG. 5.

[Detail of Process]

Next, detail of process in the transmission system according to an embodiment is described reference to FIGS. 14 to 21.

[From Login to Display of an Address List]

Figure 14A:
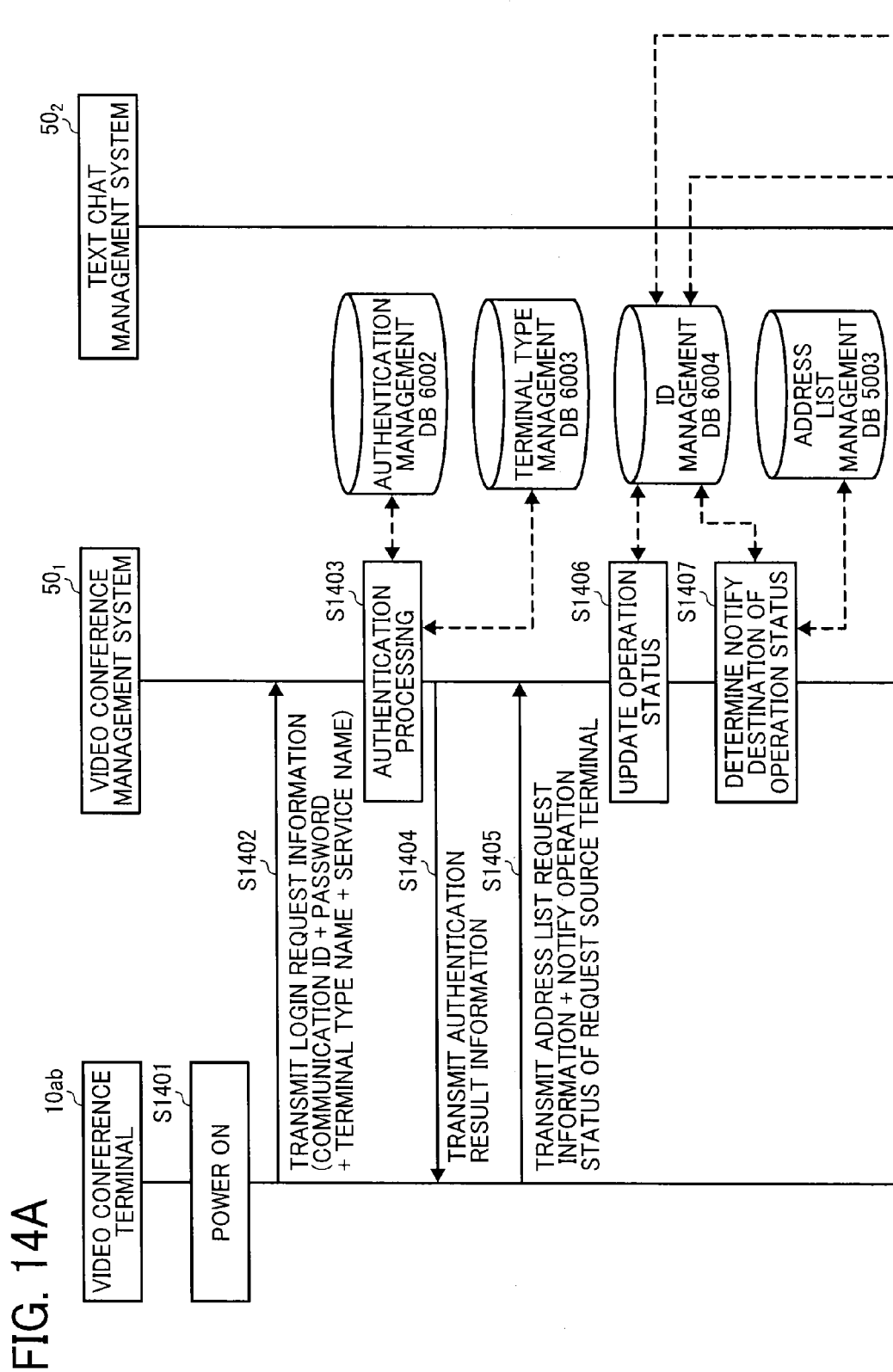
FIGS. 14A and 14B show a sequence diagram illustrating an example of a process from login to display of an address list for a video conference terminal according to an embodiment.
Figure 14B:
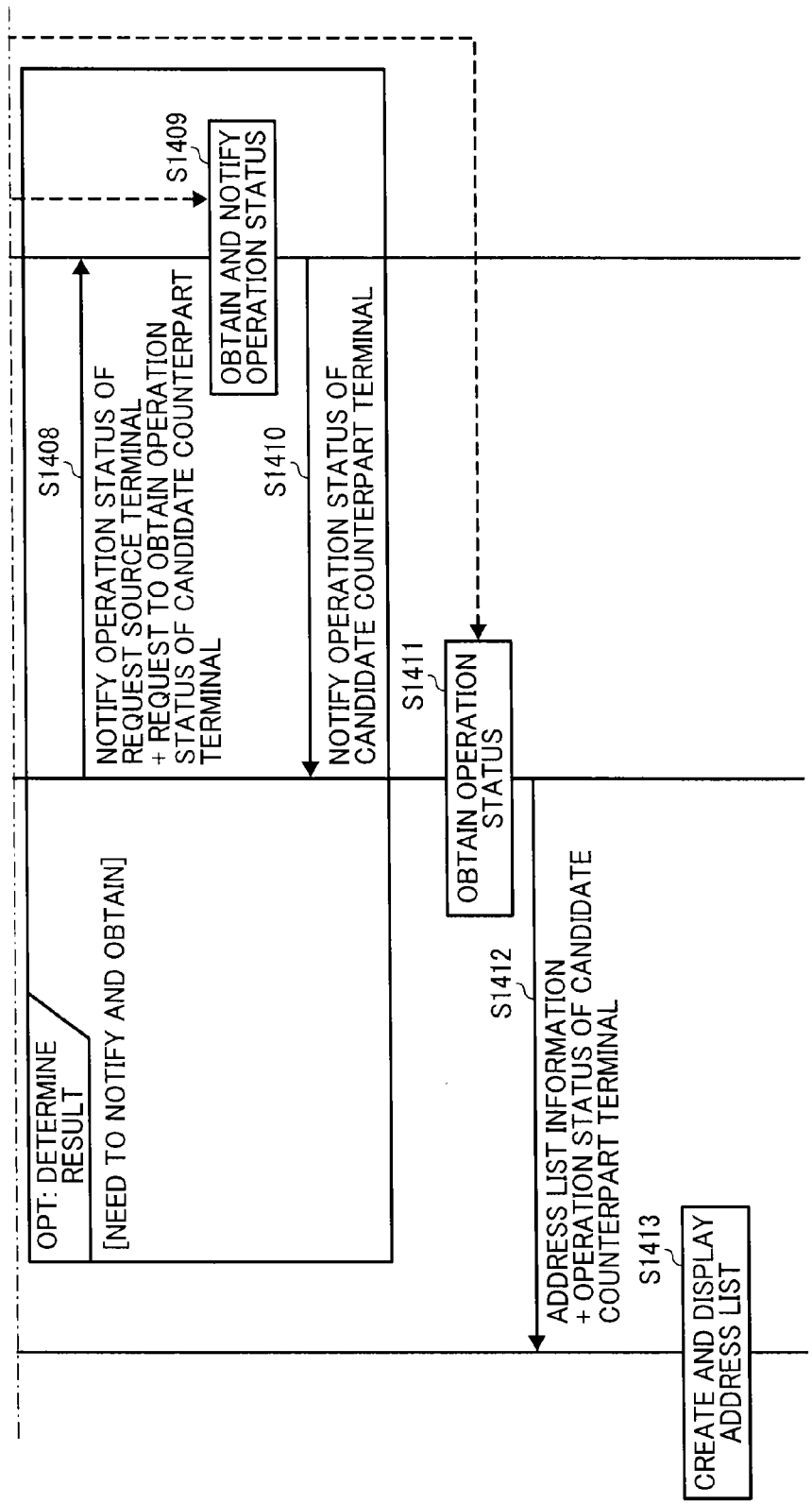

First, a process detail of displaying the address list as the list of the candidate counterpart terminals corresponding to the video conference terminal 10ab by user operation for the video conference terminal 10ab is described with reference to FIGS. 14A and 14B. FIGS. 14A and 14B show a sequence diagram illustrating an example of a process from login to display of an address list for the video conference terminal according to an embodiment.

First, when the user switches ON the power switch 109 illustrated in FIG. 2, the operation-inputs receiver unit 12 illustrated in FIG. 6 receives a power-ON signal to switch ON the power (step S1401). On receiving the power-ON signal as a trigger, the login request unit 13 automatically transmits the login request information indicating the login request from the transmitter-receiver unit 11 to the video conference management system 50$_1$ via the communication network 2 (step S1402). Note that the login request may be transmitted by the operation input of the user. The login request information includes a communication ID and a password for identifying the video conference terminal 10ab as the request source terminal. Further, the login request information includes the terminal type name and the service name of the video conference terminal 10ab. The communication ID and password are data that are retrieved from the nonvolatile storage unit 1000 via the storing-reading processing unit 18 and then transmitted to the transmitter-receiver unit 11. Further, the communication ID and password may be input by the user via the operation-inputs receiver unit 12. Further, the communication ID, password, the terminal type name, and service name may be retrieved from the external storage medium via the storing-reading processing unit 18. Note that when the login request information is transmitted from the video conference terminal 10ab to the video conference management system 50$_1$, the receiver side video conference management system 50$_1$ may detect the IP address of the transmitter side video conference terminal 10ab.

In this case, hereinafter, the terminal type name included in the login request information is "video conference" and the service name included in the login request information is "video conference."

Figure 15:
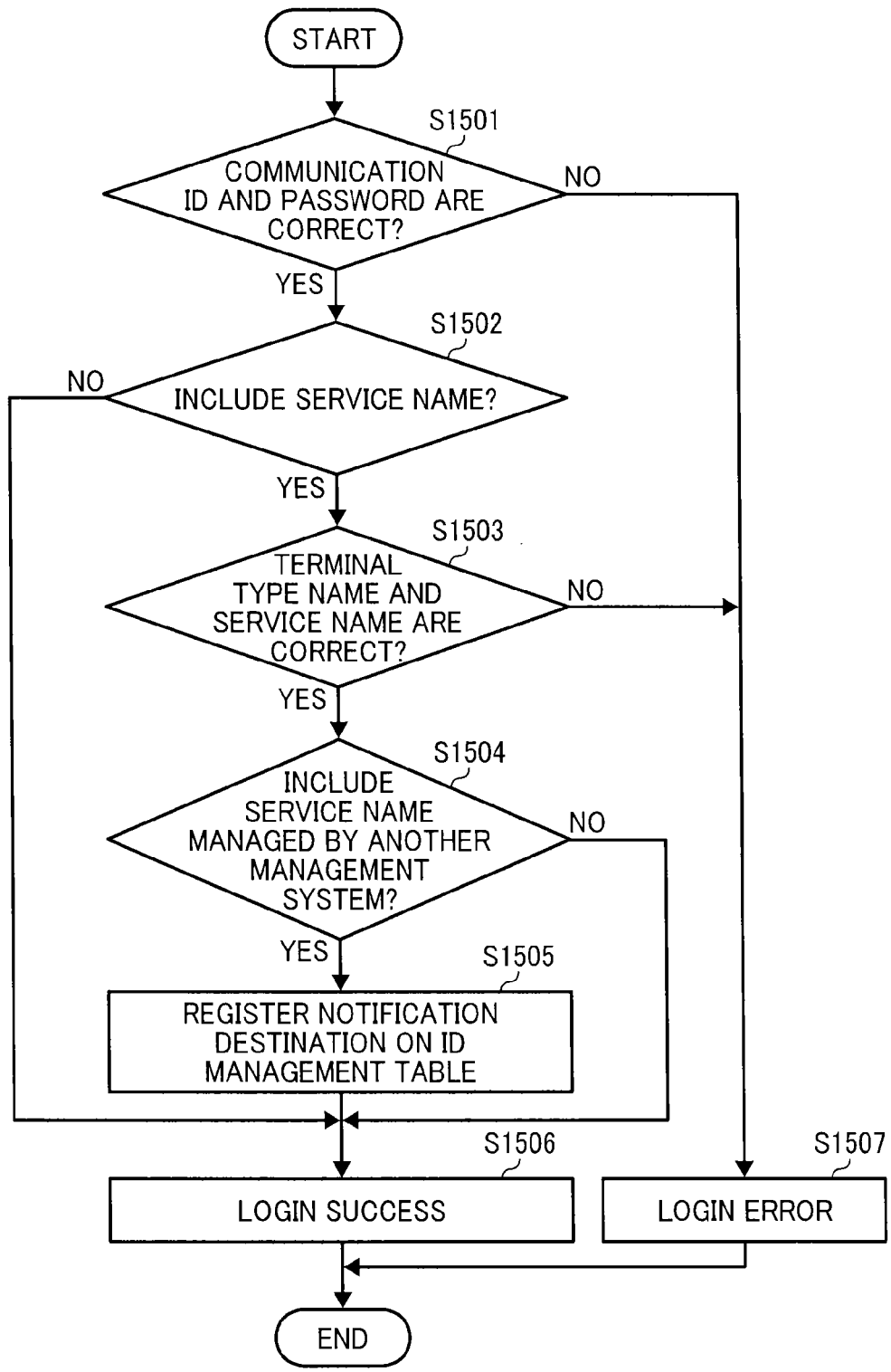
FIG. 15 is a flowchart illustrating an example of an authentication process according to an embodiment.

Next, the authentication unit 52 of the video conference management system 50$_1$ authenticates the video conference terminal 10ab corresponding to receive the login request information via the transmitter-receiver unit 51 (step S1403). The authentication process is described with reference to FIG. 15. FIG. 15 is a flowchart illustrating an example of an authentication process according to an embodiment.

Next, the authentication unit 52 of the video conference management system 50$_1$ determines whether the communication ID and password identical to those in the login request information are managed in the authentication management DB 6002 (step S1501). Thus, the video conference management system 50$_1$ obtains information of the authentication management table of the authentication management DB 6002 in the common information management apparatus 60 and determines whether the communication ID and password are managed in the authentication management table. Note that the common information management apparatus 60 may determine whether the communication ID and password are managed in the authentication management table and the authentication unit 52 of the video conference management system 50$_1$ may obtain the determination result. In the following, the case where the communication ID and password identical to those in the login request information has been included in the authentication management DB 6002 is further described. Further, when the communication ID and password identical to those in the login request information and has not been included in the authentication management DB 6002, the authentication unit 52 generates the authentication result, which indicates the login error (step 1507).

Next, the authentication unit 52 of the video conference management system 50$_1$ determines whether the login request includes a service name (step S1502). As mentioned above, the login request information transmitted by the video conference terminal 10ab includes a service name "video conference" in this case (step S1503).

Next, the authentication unit 52 of the video conference management system 50$_1$ determines whether the terminal type name and the service name included in the login request information are managed in the terminal type management DB 6003 of the common information management apparatus 60 (step S1503). Thus, the video conference management system 50$_1$ obtains information of the terminal type management table of terminal type management DB 6003 in the common information management apparatus 60 and determines whether the terminal type name and the service name included the login request information are managed in the terminal type management table. Note that the common information management apparatus 60 may determine whether the terminal type name and the service name included the login request information are managed in the terminal type management DB 6003 and the authentication unit 52 of the video conference management system 50$_1$ may obtain the determination result.

As mentioned above, in this case, the terminal type name "video conference" and the service name "video conference" are managed in the terminal type table illustrated in FIG. 12 (step S1504). Note that the common information management apparatus 60 may determine whether the terminal type name and the service name included in the login request information are managed in the terminal type management DB 6003, and the authentication unit 52 of the video conference management system 50$_1$ may obtain the determination result. Further, when the terminal type name and the service name included in the login request information have not been managed in the terminal type management DB 6003, the authentication unit 52 generates the authentication result, which indicates the login error (step S1507).

By processing in step S1503, for example, when the service name included in the login request information received from the video conference terminal 10 is "text chat," the determination result indicates login error. Therefore, it is possible to prevent a login by the service name of the transmission terminal according to a login request that cannot be utilized.

Next, the authentication unit 52 of the video conference management system 50₁ determines whether the service name includes a service of which a session control is managed by another transmission management system 50 (step S1504). Thus, the video conference management system 50₁ obtains information of the service management table from service management DB 6001 in the common information management apparatus 60 and determines whether the service name of which a session control managed by another transmission management system 50 is included in the login request information. Note that the common information management apparatus 60 may determine whether the service name included in the login request information are managed in another transmission management apparatus 50 and the authentication unit 52 of the video conference management system 50₁ may obtain the determination result.

As mentioned above, in this case, the service name included in the login request received from the video conference terminal 10ab is "video conference". The authentication unit 52 generates the authentication result that indicates login success because a session control of the service name "video conference" is managed by the video conference management system 50₁ with reference to the service management table in FIG. 10 (step S1506). Thus, in this case, the notification destination of the video conference terminal 10ab (communication ID "01ab") is not registered on the ID management table. Note that when the service name included in the login request information received from the video conference terminal 10 includes a service name of which a session control is managed by another transmission management system 50, the processing of step S1505 will be performed (step S1504: Yes). The detail processing of step S1505 is described later.

As stated above, the video conference management system 50₁ receives the login request information from the video conference terminal 10ab and generates the authentication result indicating login success based on the communication ID, password, terminal type name, and service name.

Return to the description of FIGS. 14A and 14B. The transmitter-receiver unit 51 of the video conference management system 50₁ transmits an authentication result generated in the authentication processing of the step S1403 (step S1404). In the following, the case is described where the video conference management system 50₁ has transmitted the authentication result indicating login success to the video conference terminal 10ab. Note that when the video conference terminal 10ab receives the authentication result indicating login error, the video conference terminal 10ab displays a screen page indicating a login error for the display 120ab of the video conference terminal 10ab, and ends the processing.

In the following, when the transmitter-receiver unit 11 of the video conference management system 50₁ receives the authentication result indicating a login success from the video conference management system 50₁, the transmitter-receiver unit 11 requests the address list information and provide the operation status of the video conference terminal 10ab (step S1405). The provided operation status of the video conference terminal 10ab indicates the operation status "online (communication OK)." Note that the operation status may indicate the operation status "online (communication NG)" when the operation status indicates online and the status that the video conference terminal is not able to communicate with another transmission terminal, and so on.

The status management unit 53 of the video conference system 50₁ updates the operation status of the request source terminal (the video conference terminal 10ab) to "online (communication OK)" on the ID management DB 6004 of the common information management apparatus 60 (step S1406).

Figure 16:
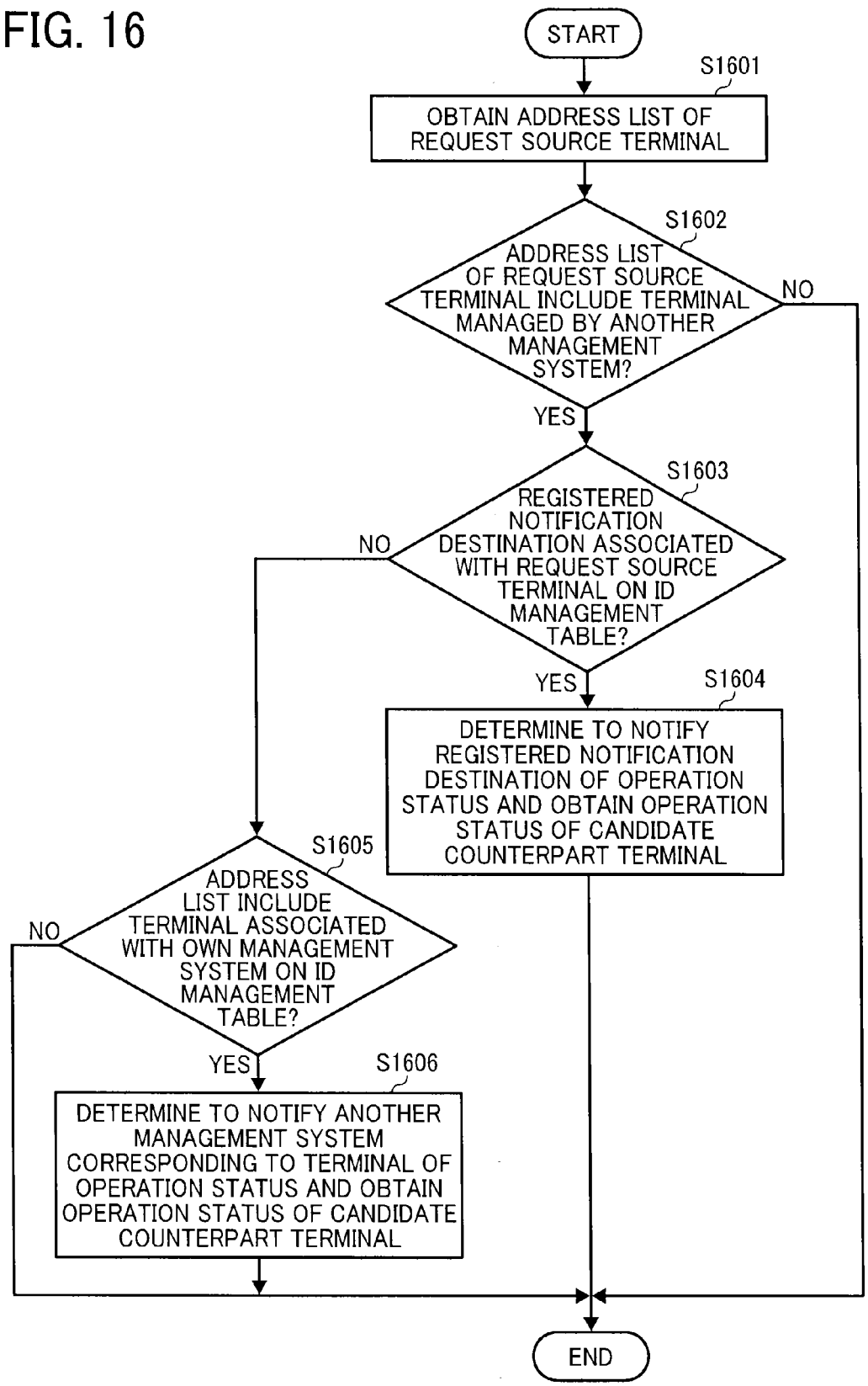
FIG. 16 is a flowchart illustrating an example of an operation status notification determining process according to an embodiment.

Further, the video conference management system 50₁ executes an operation status notification determining process (step S1407). The operation status notification determining process is described with reference to FIG. 16. FIG. 16 is a flowchart illustrating an example of an operation status notification determining process according to an embodiment.

The terminal extraction unit 54 of the video conference management system 50₁ obtains the address list of the request source terminal (the video conference terminal 10ab) from the address list management table of the address list management DB 5003 (step S1601). Note that the address list of the video conference terminal 10ab includes, for example, "01aa@videoconferencemanagementsystem," "02aa@textchatmanagementsystem," and so on.

Next, the notification destination determination unit 57 of the video conference management system 50₁ determines whether the address list obtained at the step S1601 includes the transmission terminal managed by another transmission management system 50 (step S1602).

In this case, the address list of the video conference terminal 10ab includes the transmission terminal "02aa@textchatmanagementsystem" managed by another transmission management system 50 (the text chat management system 50₂) (step S1602: Yes).

Note that when the obtained address list does not include the transmission terminal managed by another transmission management system 50, the operation status notification determining processing ends. Therefore, in this case, all of the candidate counterpart terminals included in the obtained address list are the transmission terminals managed by the video conference management system 50₁. Thus, the notification destination determination unit 57 of the video conference management system 50₁ determines not to provide the operation status of the request source terminal of another transmission management system 50 or obtain the same from another transmission management system 50.

Next, the notification destination determination unit 57 of the video conference management system 50₁ determines whether the notification destination of the request source terminal (the video conference terminal 10ab) is registered on the ID management table (step S1603).

In this case, the notification destination of the video conference terminal 10ab (the communication ID "01ab") is not registered on the ID management table (step S1603: No).

Next, the notification destination determination unit 57 of the video conference management system 50₁ determines whether the candidate counterpart terminal included in the address list of the request source terminal (the video conference terminal 10ab) is associated with the transmission management system (the video conference management system 50₁) as the notification destination on the ID management table (step S1605).

In this case, the mobile terminal 20aa (the communication ID "02aa") included in the address list of the video conference terminal 10ab is associated with "the video conference system" as the notification destination on the ID management table (step S1605: Yes).

Note that when the counterpart terminal is not associated with the transmission management system (the video conference management system 50₁) as the notification destination on the ID management table, the operation status notification determining processing is ended. Therefore, in this case, it is not necessary to provide the operation status of the request source terminal of another transmission terminal 50 even if the counterpart terminals of the obtained address list include the transmission terminal managed by another transmission management system. For example, it indicates that the candidate counterpart terminal includes the transmission terminal for text chat. When the video conference terminal 10 is not able to utilize the text chat service and the transmission terminal for the text chat is not able to utilize the video conference service, it is not necessary to provide and obtain the presence information (e.g., the operation status) between the video conference terminal 10 and the transmission terminal for the text chat.

Next, the notification destination determination unit 57 of the video conference management system 50$_1$ determines whether to provide status information of another transmission management system that manages the candidate counterpart terminal associated with the transmission management system (the video conference transmission management system 50$_1$) as the notification destination and to obtain the operation status of the candidate counterpart terminal (step S1606).

In this case, the notification destination determination unit 57 determines whether to provide the operation status of the text chat management system 50$_2$ that manages the mobile terminal 20aa (the communication ID "02aa") included in the address list of the video conference terminal 10ab and to obtain the operation status.

Returning to the description of FIGS. 14A and 14B, when the notification destination determination unit 57 determines whether to provide the operation status of another transmission management system 50 and to obtain the operation status in the operation status notification determining process (step S1407) illustrated in FIG. 16, the processes of step S1408 to step S1410 are executed. As stated above, in this case, the processes of step S1408 to step S1410 are executed because it has been determined to provide the operation status of the text chat management system 50$_2$ and to obtain the operation status.

The transmitter-receiver unit 51 of the video conference management system 50$_1$ transmits the operation status "online (communication OK)" of the request source terminal (the video conference terminal 10ab) and the request to obtain the operation status of the candidate counterpart terminal (the mobile terminal 20aa) to the text chat management system 50$_2$ (step S1408).

Next, when the text chat management system 50$_2$ receives the operation status of the request source terminal and the request to obtain the operation status of the candidate counterpart terminal, the terminal status notification and acquisition unit 55 of the text chat management system 50$_2$ acquires the operation status of the candidate counterpart terminal and provides the operation status of the request source terminal of the candidate counterpart terminal (step S1409). Note that the operation status of the request source terminal is provided to the candidate counterpart terminal only when the operation status of the candidate counterpart terminal indicates "online."

In this case, the terminal status notification and acquisition unit 55 of the text chat management system 50$_2$ acquires the operation status of the mobile terminal 20aa (the communication ID "02aa") as the candidate counterpart terminal from the ID management DB 6004. Further, when the operation status of the mobile terminal 20aa is "online," the terminal status notification and acquisition unit 55 of the text chat management system 50$_2$ notifies the operation status "online" of the video conference terminal 10ab of the mobile terminal 20aa. Thus, the mobile terminal 20aa is able to detect the operation status "online" of the video conference terminal 10ab as the candidate counterpart terminal in the address list.

Further, the transmitter-receiver unit 51 of the text chat management system 50$_2$ provides the operation status of the candidate counterpart (the mobile terminal 20aa) of the video conference management system 50$_1$ (step S1410).

The terminal status notification and acquisition unit 55 of the video conference management system 50$_1$ acquires the operation status of the transmission terminal managed by the transmission management system (the video conference management system 50$_1$), among the operation statuses of the candidate counterpart terminals, from the ID management DB 6004 (step S1411). In this case, the terminal status notification and acquisition unit 55 of the video conference management system 50$_1$ acquires the operation status of the video conference terminal 10aa (the communication ID "01aa") managed by the transmission management system from the ID management DB 6004.

Further, the transmitter-receiver unit 51 of the video conference management system 50$_1$ provides the address list information (e.g., the communication ID) of the request source terminal and the operation status of the candidate counterpart terminal acquired at the step S1410 and the step S1411 of the request source terminal (the video conference terminal 10ab) (step S1412). In this case, the transmitter-receiver unit 51 transmits the address list information of the video conference terminal 10ab as the request source terminal and the operation status of the video conference terminal 10aa and the mobile terminal 20aa that are included in the address list to the video conference terminal 10ab.

Figure 17:
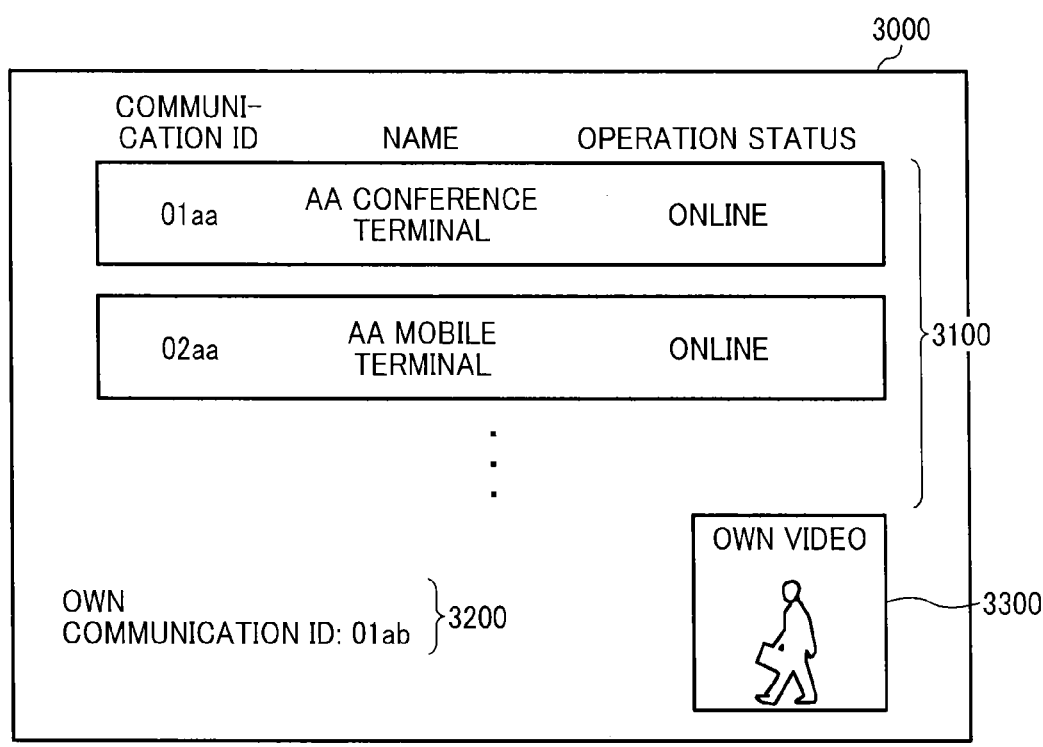
FIG. 17 is an example of an address list display screen page displayed on a display of a video conference terminal according to an embodiment.

The address list creation unit 17 of the video conference terminal 10ab creates the address list screen page based on the address list information and the operation status that are received from the video conference management system 50$_1$, and displays the created address list screen page on the display 120ab (step S1413). In this case, for example, the address list display screen page 3000 illustrated in FIG. 17 is displayed on the display 120ab. FIG. 17 is an example of the address list display screen page displayed on the display of the video conference terminal 10. The address list 3100, the communication ID 3200, and the video 3300 captured by the terminal are displayed on the address list display screen page 3000. The list of the transmission terminals as the candidate counterpart terminals of the video conference terminal 10ab is displayed on the address list 3100. The communication ID, the names, and the operation status of the candidate counterpart terminals, are displayed on the list of the candidate counterpart terminals.

The communication ID 3200 is the communication ID of the video conference terminal 10ab. The video 3300 is captured by the camera 1021 of the video conference terminal 10ab.

The user of the video conference terminal 10ab is able to conduct a video conference with the transmission terminal by selecting the desired transmission terminal from the address list 3100 of the address list display screen page 3000. Note that, for example, the user is not able to conduct a video conference with the transmission terminal that its operation status indicates "offline" or "communicating."

Figure 18B:
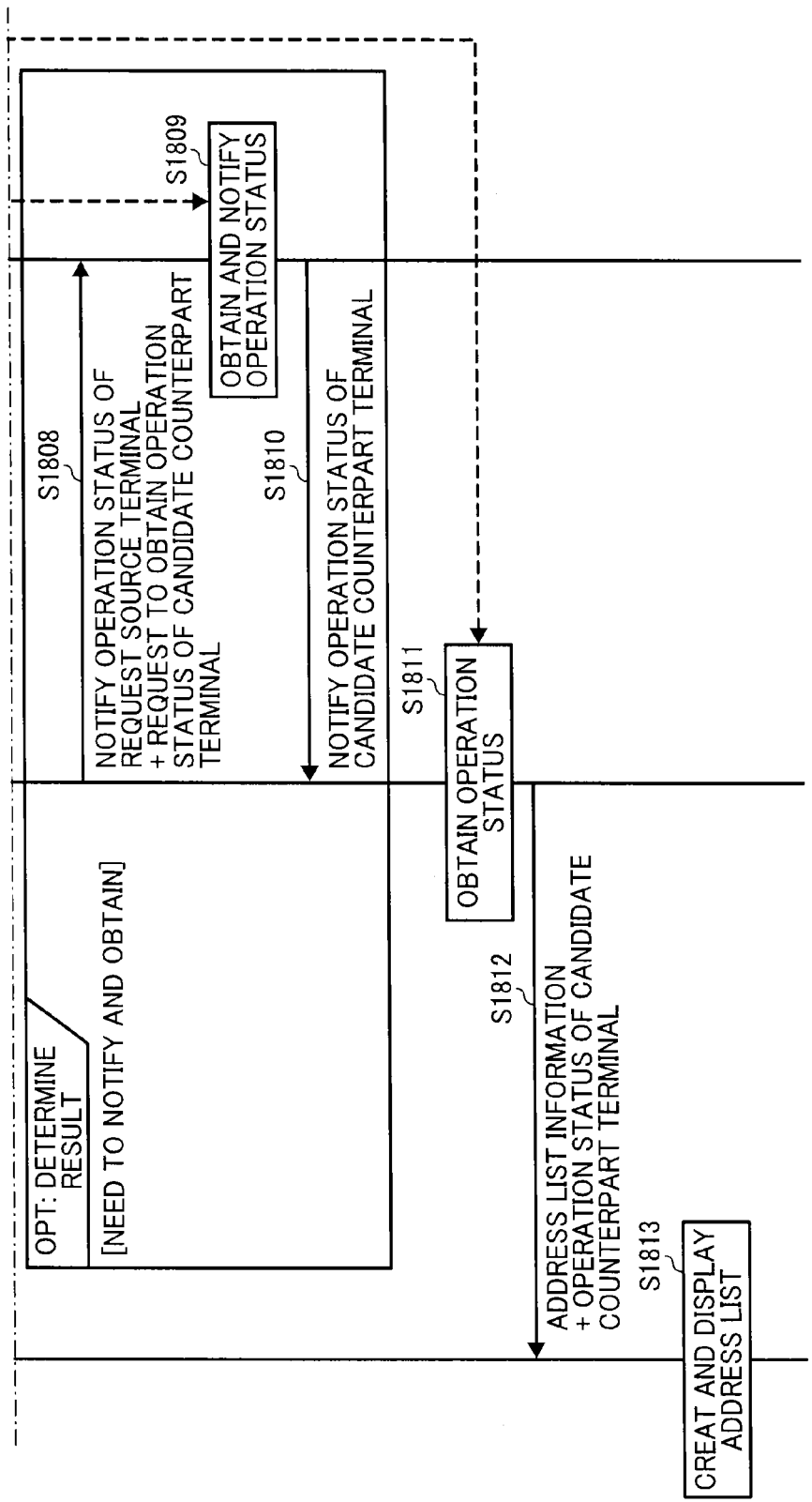

Next, a process detail of displaying the address list as the list of the candidate counterpart terminals corresponding to the mobile terminal 20aa by the user operation for the mobile terminal 20aa is described with reference to FIGS. 18A and 18B. FIGS. 18A and 18B show a sequence diagram illustrating an example of a process from login to display of an address list for the mobile terminal according to an embodiment.

The user logs in via the input device 202 of the mobile terminal 20 (step S1801). On receiving the login operation as a trigger by the operation-inputs receiver unit 12, the login request unit 13 transmits the login request information to the text chat management system 50₂ (step S1802). The login request information includes a communication ID and a password for identifying the mobile terminal 20aa indicating a terminal as the request source terminal.

Further, the login request information includes the terminal type name and the service name of the mobile terminal 20aa. Note that the communication ID and password are input via the operation-inputs receiver unit 12 when the user executes the login operation. Note that when the login request information is transmitted from the mobile terminal 20aa to the text chat management system 50₂, the receiver side text chat management system 50₂ may detect the IP address of the transmitter side mobile terminal 20aa.

In this case, hereinafter, the terminal type name included in the login request information is "general-purpose" and the service name included in the login request information is "video conference, text chat."

Next, the authentication unit 52 of the text chat management system 50₂ authenticates the mobile terminal 20aa corresponding to receive the login request information via the transmitter-receiver unit 51 (step S1803). The authentication process is described with reference to FIG. 15. FIG. 15 is a flowchart illustrating an example of an authentication process according to an embodiment.

Next, the authentication unit 52 of the text chat management system 50₂ determines whether the communication ID and password identical to those in the login request information are managed in the authentication management DB 6002 (step S1501). Thus, the text chat management system 50₂ obtains information of the authentication management table of the authentication management DB 6002 in the common information management apparatus 60 and determines whether the communication ID and password are managed in the authentication management table. Note that the common information management apparatus 60 may determine whether the communication ID and password are managed in the authentication management table and the authentication unit 52 of the text chat management system 50₂ may obtain the determination result. In the following, the case where the communication ID and password identical to those in the login request information has been included in the authentication management DB 6002 is further described. Further, when the communication ID and password identical to those in the login request information has not been included in the authentication management DB 6002, the authentication unit 52 generates the authentication result, which indicates the login error (step S1507).

Next, the authentication unit 52 of the text chat management system 50₂ determines whether the login request includes the service name (step S1502). As mentioned above, the login request information transmitted by the mobile terminal 20aa includes the service name "video conference, text chat" in this case (step 1803). Further, when the login request does not include the service name, the authentication unit 52 generates the authentication result indicating login success. Note that when the login request information transmitted by the mobile terminal 20aa does not include the service name, the mobile terminal 20aa may install an Instant Message (IM) client that does not support to transmit the login request information including the service name.

Next, the authentication unit 52 of the text chat management system 50₂ determines whether the terminal type name and the service name included in the login request information are managed in the terminal type management DB 6003 of the common information management apparatus 60 (S1503). Thus, the text chat management system 50₂ obtains information of the terminal type management table of terminal type management DB 6003 in the common information management apparatus 60 and determines whether the terminal type name and the service name included in the login request information are managed in the terminal type management table. Note that the common information management apparatus 60 may determine whether the terminal type name and the service name included in the login request information are managed in the terminal type management DB 6003 and the authentication unit 52 of the text chat management system 50₂ may obtain the determination result.

As mentioned above, in this case, the terminal type name "general-purpose" and the service name "video conference, text chat" are managed in the terminal type table illustrated in FIG. 12 (step S1504). Note that the common information management apparatus 60 may determine whether the terminal type name and the service name included in the login request information are managed in the terminal type management DB 6003 and the authentication unit 52 of the text chat management system 50₂ may obtain the determination result. Further, when the terminal type name and the service name included in the login request information has not been managed in the terminal type management DB 6003, the authentication unit 52 generates the authentication result, which indicates the login error (step S1507).

Next, the authentication unit 52 of the text chat management system 50₂ determines whether the service name includes a service of which a session control is managed by another transmission management system 50 (step S1504). Thus, the text chat management system 50₂ obtains information of the service management table from service management DB 6001 in the common information management apparatus 60 and determines whether the service name of which a session control managed by another transmission management system 50 is included in the login request information. Note that the common information management apparatus 60 may determine whether the service name included in the login request information are managed in another transmission management apparatus 50 and the authentication unit 52 of the text chat management system 50₂ may obtain the determination result.

As mentioned above, in this case, the service name included in the login request received from the mobile terminal 20aa is "video conference, text chat". The service name includes the service name managed by another transmission management system 50 because a session control of the service name "video conference" is managed by the video conference management system 50₁ with reference to the service management table in FIG. 10 (step S1504: Yes).

The authentication unit 52 of the text chat management system 50₂ registers another transmission management system 50 as the notification destination corresponding to the request source terminal (the mobile terminal 20ab) on the ID management table (step S1505). In this case, the text chat management system 50₂ registers "video conference management system" as the notification destination corresponding to the mobile terminal 20aa (the communication ID "02aa") on the ID management table of the common information management apparatus 60. Then, the authentication unit 52 of the text chat management system 50₂ generates the authentication result indicating login success.

As mentioned above, the mobile terminal 20aa generates the authentication result indicating login success based on the communication ID, the password, the terminal type name, and the service name. When the session control of the service corresponding to the service name included in the login request is managed by another transmission management system 50, the text chat management system 50 registers another transmission management system 50 as the notification destination corresponding to request source terminal on the ID management table. Then, the status information (e.g., the operation status) of the request source terminal is notified of the registered transmission management system 50 by the later-described process.

Returning to the description of FIGS. 18A and 18B, the transmitter-receiver unit 51 of the text chat management system 50, transmits authentication result generated in the authentication processing of the step S1803 (step S1804). In the following, the case where the text chat management system 50$_2$ has transmitted the authentication result indicating login success to the mobile terminal 20aa. Note that when the mobile terminal 20aa receives the authentication result indicating login error, the mobile terminal 20aa displays a screen page indicating login error for the display device 203 of the mobile terminal 20aa and ends the processing.

In the following, when the transmitter-receiver unit 11 of the text chat management system 50$_2$ receives the authentication result indicating login success from the text chat management system 50$_2$, the transmitter-receiver unit 11 requests the address list information and provide the operation status of the mobile terminal 20aa (step S1805). The provided operation status of the mobile terminal 20aa indicates the operation status "online (communication OK)." Note that the operation status may indicate the operation status "online (communication NG)" when the operation status indicates online and the status that the mobile terminal 20aa is not able to communicate with another transmission terminal, and so on.

The status management unit 53 of the text chat management system 50$_2$ updates the operation status of the request source terminal (the mobile terminal 20aa) to "online (communication OK)" on the ID management DB 6004 of the common information management apparatus 60 (step S1806).

Further, the text chat management system 50$_2$ executes an operation status notification determining process (step S1807). The operation status notification determining process is described with reference to FIG. 16. FIG. 16 is a flowchart illustrating an example of an operation status notification determining process according to an embodiment.

The terminal extraction unit 54 of the text chat management system 50$_2$ obtains the address list of the request source terminal (the mobile terminal 20aa) from the address list management table of the address list management DB 5003 (step S1601).

Next, the notification destination determination unit 57 of the text chat management system 50$_2$ determines whether the address list obtained at the S1601 includes the transmission terminal managed by another transmission management system 50 (step S1602).

In this case, the address list of the mobile terminal 20aa includes the transmission terminals "02ab@videoconferencemanagementsystem" and "01ab@videoconferencemanagementsystem" managed by another transmission management system 50 (step S1602: Yes).

Note that when the obtained address list does not include the transmission terminal managed by another transmission management system 50, the operation status notification determining processing is ended. Therefore, in this case, all of the candidate counterpart terminals included in the obtained address list are the transmission terminals managed by the text chat management system 50$_2$. Thus, the notification destination determination unit 57 of the text chat management system 50$_2$ determines not to provide the operation status of the request source terminal of another transmission management system 50 or obtain from another transmission management system 50.

Next, the notification destination determination unit 57 of the text chat management system 50$_2$ determines whether the notification destination of the request source terminal (the mobile terminal 20aa) is registered on the ID management table (step S1603).

In this case, the notification destination of the mobile terminal 20aa (the communication ID "02aa") is not registered on the ID management table (step S1603: No).

Next, the notification destination determination unit 57 of the text chat management system 50$_2$ determines whether the counterpart terminal included in the address list of the request source terminal (the mobile terminal 20aa) is associated with the transmission management system (the text chat management system 50$_2$) as the notification destination on the ID management table (step S1605).

Returning to the description of FIGS. 18A and 18B, when the notification destination determination unit 57 determines whether to provide the operation status of another transmission management system 50 and obtain the operation status in the operation status notification determining process (step S1807) illustrated in FIG. 16, the processes of step S1808 to step S1810 are executed. As stated above, in this case, the processes of step S1808 to step S1810 are executed because it has been determined to provide the operation status of the video conference management system 50$_1$ and obtain the operation status.

The transmitter-receiver unit 51 of the text chat management system 50$_2$ transmits the operation status "online (communication OK)" of the request source terminal (the mobile terminal 20aa) and the request to obtain the operation status of the candidate counterpart terminal (the video conference terminal 10ab) to the video conference management system 50$_1$ (step S1808).

Next, when the video conference management system 50$_1$ receives the operation status of the request source terminal and the request to obtain the operation status of the counterpart terminal, the terminal status notification and acquisition unit 55 of the video conference management system 50$_1$ acquires the operation status of the candidate counterpart terminal and provides the operation status of the request source terminal of the candidate counterpart terminal (step S1809). Note that the operation status of the request source terminal is notified of the candidate counterpart terminal only when the operation status of the candidate counterpart terminal indicates "online."

In this case, the terminal status notification and acquisition unit 55 of the video conference management system 50$_1$ acquires the operation status of the video conference terminal 10ab (the communication ID "01ab") as the candidate counterpart terminal from the ID management DB 6004. Further, the operation status of the request source terminal is not notified of the video conference terminal 10ab because the operation status of the video conference terminal 10ab is "offline."

Further, the transmitter-receiver unit 51 of the video conference management system 50$_1$ provides the operation status of the candidate counterpart (the video conference terminal 10ab) of the text chat management system 50$_2$ (step S1810).

The terminal status notification and acquisition unit 55 of the text chat management system 50$_2$ acquires the operation status of the transmission terminal managed by the transmission management system (the text chat management system $50_2$), among the operation statuses of the candidate counterpart terminals, from the ID management DB 6004 (step S1811). In this case, the terminal status notification and acquisition unit 55 of the text chat management system $50_2$ acquires the operation status of the mobile terminal 20ab (the communication ID "02ab") managed by the transmission management system from the ID management DB 6004.

Further, the transmitter-receiver unit 51 of the text chat management system $50_2$ provides the address list information (e.g., the communication ID) of the request source terminal and the operation status of the candidate counterpart terminal acquired at the step S1810 and the step S1811 of the request source terminal (the mobile terminal 20aa) (step S1812). In this case, the transmitter-receiver unit 51 transmits the address list information of the mobile terminal 20aa as the request source terminal and the operation statuses of the mobile terminal 20ab and the video conference terminal 10ab that are included in the address list to the mobile terminal 20aa.

Figure 19:
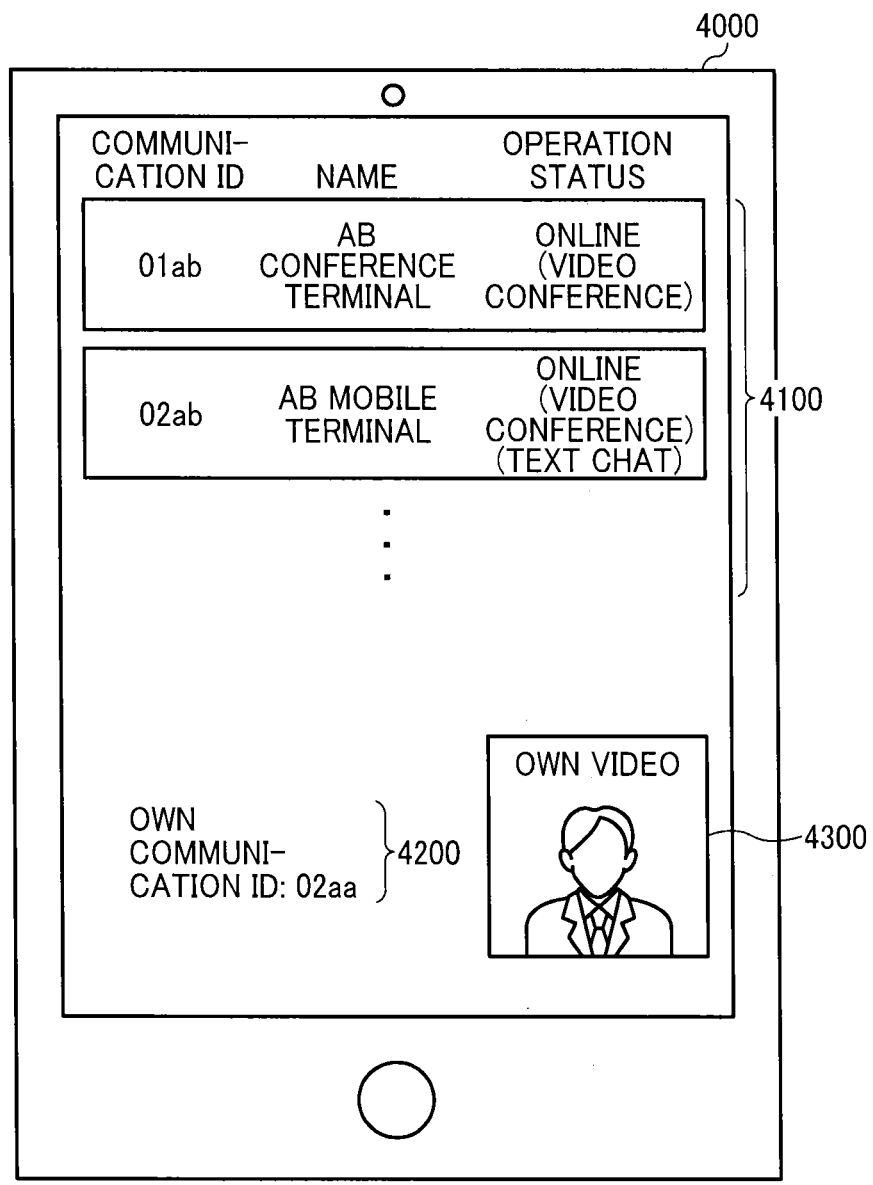
FIG. 19 is an example of an address list display screen page displayed on a display of a mobile terminal according to an embodiment.

The address list creation unit 17 of the mobile terminal 20aa creates the address list screen page based on the address list information and the operation status that are received from the text chat management system $50_2$ and displays the created address list screen page on the display device 203 (step S1813). In this case, for example, the address list screen page illustrated in FIG. 19 is displayed on the display device 203. FIG. 19 is an example of the address list display screen page displayed on the display of the mobile terminal 20. The address list 4100, the communication ID 4200, and the video 4300 captured by the terminal are displayed on the address list display screen page 4000. The list of the transmission terminals as the candidate counterpart terminals of the mobile terminal 20aa is displayed on the address list 4100. The communication ID, the names, the operation status of the candidate counterpart terminals, the services (the video conference and the text chat) that the candidate counterpart terminal is able to utilize are displayed on the list of the candidate counterpart terminals.

The communication ID 4200 is the communication ID of the mobile terminal 20aa. The video 4300 is captured by the camera 210 of the mobile terminal 2aa.

The user of the mobile terminal 20aa is able to conduct a video conference or a text chat with the transmission terminal by selecting the desired transmission terminal from the address list 4100 of the address list display screen page 400. Note that, for example, the user is not able to conduct a video conference with the transmission terminal that its operation status indicates "offline" or "communicating."

Figure 20:
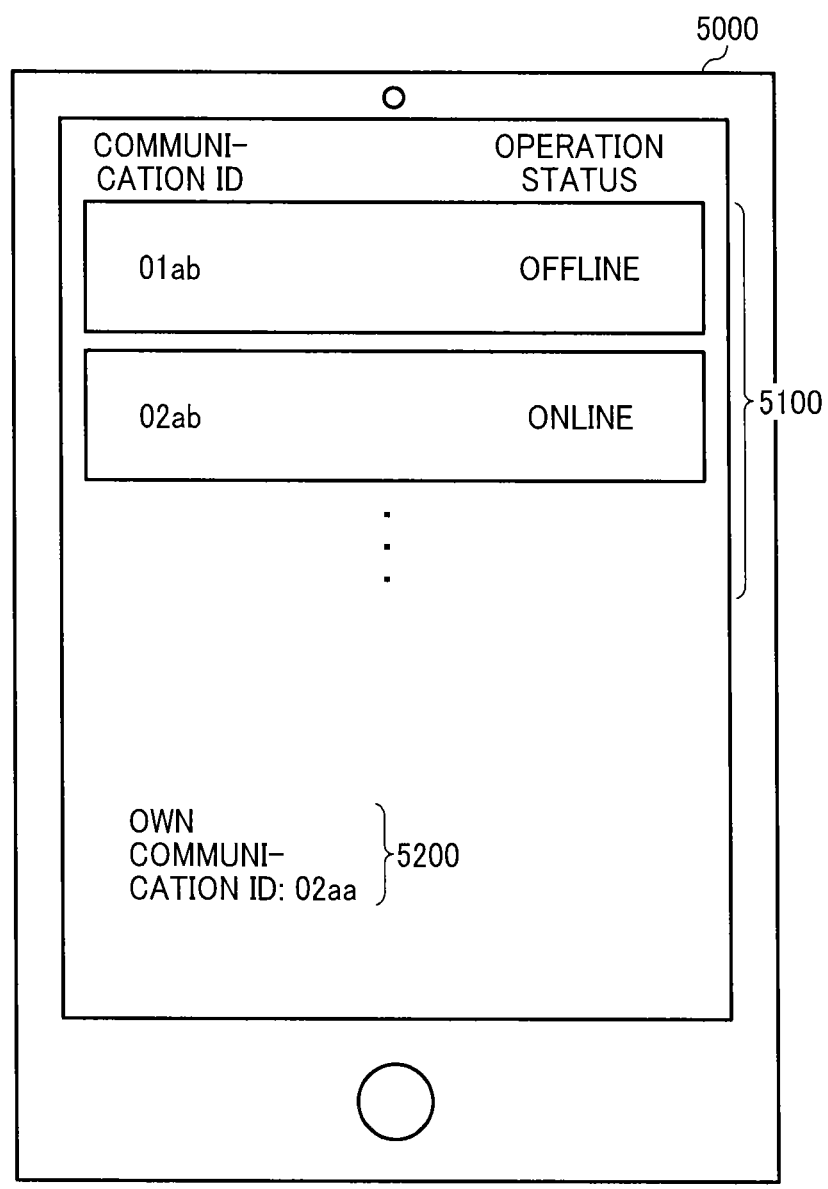
FIG. 20 is an another example of an address list display screen page displayed on a display of the mobile terminal according to an embodiment.

Further, for example, when the user utilize the text chat service of the transmission system 1 by using the IM client installed in the mobile terminal 20aa (the terminal type "text chat"), the address list screen page 5000 illustrated in FIG. 20 is displayed. The address list 5100 and the communication ID 5200 are displayed on the address list display screen page 5000. The list of the transmission terminals as the candidate counterpart terminals of the mobile terminal 20aa is displayed on the address list 5100. The communication ID and the operation status of the candidate counterpart terminals are displayed on the list of the candidate counterpart terminals. Further, for example, when the user utilizes the text chat service of the transmission system 1 by using the IM client, installed in the mobile terminal 20aa, that is not able to transmit the login request included in the service name, the mobile terminal 20aa is not able to obtain the operation status of the transmission terminal managed by another transmission management system 50. In this case, the operation status of the communication ID "01aa" included in the address list indicates "offline". Note that the operation status may indicate not to be able to obtain the operation status or not to obtain the operation status. Further, the communication ID 5200 is the communication ID of the mobile terminal 20aa. The login request does not include the service name, the authentication unit 52 generates the authentication result indicating login success. Note that when the login request information transmitted by the mobile terminal 20aa does not include the service name, the mobile terminal 20aa may install an Instant Message (IM) client that does not support to transmit the login request information including the service name.

As described above, the transmission terminal 10, 20 in the transmission system 1 transmits the login request to the transmission management system 50 that manages the transmission terminals when the transmission terminal 10, 20 receives the operation of the user as a trigger. The transmission management system 50 determines whether to provide the status information (e.g., the operation status) of the transmission terminal of another transmission management system based on various information included in the login request. Then, the transmission management system 50 provides the status information of another transmission management system and acquires the status information of the transmission terminal 10, 20 that are managed by another transmission management system based on the determining result.

Therefore, it is possible to share the status information of the transmission terminal 10, 20 that are able to utilize the different services among the transmission management systems when each of the transmission management systems controls a session control of the different services.

[From Select Counterpart Terminal to Establish Session]

Next, a processing of session initiation to conduct a video conference or a text chat between the request source terminal and the counterpart terminal is described. The following embodiment, for example, will describe a case where the mobile terminal 20aa as the request source terminal initiates a session for conducting a video conference by selecting the video conference terminal 10ab (the communication ID "01ab") from the address list 4100 of the address list screen page 4000 displayed on the display device 203. FIG. 21 is a sequence diagram illustrating an example of a process of communication initiation among a plurality of the terminals according to an embodiment.

At first, the user of the mobile terminal 20aa selects the counterpart terminal (the communication ID "01ab") from the address list 4100 by the input device 202. Then, the operation-inputs receiver unit 12 receives the request to initiate a session (step S2102). Further, the transmitter-receiver unit 11 of the mobile terminal 20aa transmits the initiation request information indicating to initiate a session to the text chat management system $50_2$ (step S2102). The initiation request information includes the communication ID "02aa" of the request source terminal (the mobile terminal 20aa) and the communication ID "01ab" of the request source terminal (the video conference terminal 10ab). Thus, the text chat management system $50_2$ may detect the IP address "1.4.1.1" of the request source terminal (the mobile terminal 20aa). Note that the text chat management system $50_2$ may update the operation statuses of the request source terminal and the counterpart terminal managed on the ID management DB 6004 of the common information management apparatus 60 to "online (communication OK)."

Note that when the user, for example, selects the counterpart terminal (the communication ID "02aa") from the address list 4100 of the mobile terminal 20aa, the user may select the service (e.g., video conference, text chat) for connecting to the counterpart terminal at the step S2102. Further, the initiation request information may include the service name of the service utilized between the request source terminal and the counterpart terminal at the step S2101.

Further, when the user uses the video conference terminal 10 as the request source terminal, the transmitter-receiver unit 11 of the video conference terminal 10 transmits the initiation request information (step S2102) to the video conference management system $50_1$. Thus, the request source terminal transmits the initiation request information to the transmission management system 50 that manages the session control of the terminal.

Next, the session management unit 56 of the text chat management system $50_2$ creates the session ID (step S2103). In this case, "se1" as the session ID is created. Then, the session ID "se1," the communication ID "02aa," and the communication ID "01ab" are stored in association with the session management DB 5002 (step S2104). Further, the session management unit 56 of the text chat management system $50_2$ selects the appropriate relay apparatus 30 for relaying the communication between the request source terminal (the mobile terminal 20aa) and the counterpart terminal (the video conference terminal 10ab) (step S2105). The appropriate relay apparatus 30 may be selected among the online relay apparatuses from the relay apparatus management DB 5001. In this case, the relay apparatus 30a is selected. The session management unit 56 stores the relay apparatus ID "30a" and the session ID"se1" created at step S2103 in association with the session management DB 5002. Note that the session management unit 56 may select the relay apparatus 30 on the network that has a widest communication band for communicating between the request source terminal and the counterpart terminal.

Further, for example, when it is only a text chat service utilized between the request source terminal and the counterpart terminal, the content data transmitted and received between the request source terminal and the counterpart terminal is text data. Thus, the session system 1 may establish directly between the request source terminal and the counterpart terminal without selecting the relay apparatus 30 at the step S2105. Further, the transmission system 1 may establish between the request source terminal and the counterpart terminal via the text chat management system $50_2$ without selecting the relay apparatus 30 at the step S2105.

Further, the transmitter-receiver unit 51 of the text chat management system $50_2$ transmits the session ID "se1" created at the step S2103 and the IP address "1.2.1.2" of the selected relay apparatus 30a at the step S2105 to the request terminal (the mobile terminal 20aa) and the counterpart terminal (the video conference terminal 10ab) (step S2106 and step S2107). Further, the transmitter-receiver unit 51 of the text chat management system $50_2$ transmits the IP address of the request source terminal and the IP address of the counterpart terminal to the relay apparatus 30a (step S2108). The transmitter-receiver unit 51 is able to obtain the IP address of the relay apparatus 30a from the relay apparatus management DB 5001 via the storage-reading processing unit 58. Therefore, the session is established between the request terminal and the counterpart terminal (step S2109).

Then, the content data is transmitted and received between the request terminal and the counterpart terminal via the relay apparatus 30a by using the established session at the step S2109.

Note that "service name" described with an embodiment may be information of the service identifying the service. The information of the service may include not only the languages but the characters or various symbols.

As described above, each of the transmission management systems 50 that manages the session control of each of the different services is able to provide the status information of the transmission terminal that utilizes a plurality of the different services of another transmission terminal in the transmission system 1 according to an embodiment. Therefore, while each of the transmission management systems 50 can manage the session control of the corresponding service, each of the transmission management systems 50 can manage the session control of the transmission terminal that can utilize a plurality of the different services in the transmission system 1 according to an embodiment.

Note that the authentication unit 52 may be an example of a notification registration unit in an embodiment. Further, the notification destination determination unit 57 may be an example of a determination unit in an embodiment. Further, the transmitter-receiver unit 51 may be an example of a first notification unit, a second notification unit, or an acquisition unit in an embodiment.

It should be understood that the various changes, substitutions, and alterations could be made hereto without departing from the spirit and scope of the invention.

What is claimed is:

1. A transmission management apparatus, comprising:
   a memory configured to store address information that associates, for each one of a plurality of request source terminals, request source terminal identification information for identifying the request source terminal configured to request starting communication with at least one candidate counterpart terminal, and candidate counterpart terminal identification information for identifying the at least one candidate counterpart terminal;
   a receiver configured to receive connection request information from a transmission terminal as the request source terminal; and
   processing circuitry configured to:
      determine whether to provide status information of the transmission terminal of another transmission management apparatus, based on information of the another transmission management apparatus associated with the at least one candidate counterpart terminal included in the address information of the transmission terminal, to generate a determination result when the receiver receives the connection request information,
      provide the status information of the transmission terminal of the another transmission management apparatus based on the determination result,
      acquire status information of the at least one candidate counterpart terminal managed by the another transmission management apparatus included in the address information of the transmission terminal for notifying the transmission terminal when the transmission management apparatus provides the status information of the transmission terminal of the another transmission management apparatus,
      register a notification destination of the status information in the memory when the connection request information includes service information of a service managed by another transmission management apparatus, and
      not register a notification destination of the status information in the memory when the connection request information does not include service information of a service managed by another transmission management apparatus.

2. The transmission management apparatus of claim 1, wherein the processing circuitry is further configured to determine whether to provide status information when the at least one candidate counterpart terminal included in the address information of the transmission terminal is associated with notification destination information indicating another transmission management apparatus in the memory.

3. The transmission management apparatus of claim 1, wherein the processing circuitry is further configured to determine not to provide status information when the address information of the transmission terminal does not include the at least one candidate counterpart terminal managed by another transmission management apparatus.

4. The transmission management apparatus of claim 1, wherein the processing circuitry is further configured to provide the status information of the at least one candidate counterpart terminal managed by another transmission management apparatus and the status information of the at least one candidate counterpart terminal managed by the transmission management apparatus of the transmission terminal.

5. The transmission management apparatus of claim 1, wherein the service information includes information of a conference service configured to transmit and to receive sound or video data among the request source terminal and the at least one candidate counterpart terminal.

6. The transmission management apparatus of claim 1, wherein the service information includes information of a text chat service configured to transmit and to receive text data among the request source terminal and the at least one candidate counterpart terminal.

7. A method of providing status information in a communication system, comprising:
    storing, in a memory of a transmission management apparatus, address information that associates, for each one of a plurality of request source terminals, request source terminal identification information for identifying the request source terminal configured to request starting communication with at least one candidate counterpart terminal, and candidate counterpart terminal identification information for identifying the at least one candidate counterpart terminal;
    receiving, in the memory, connection request information from a transmission terminal as the request source terminal;
    determining, using processing circuitry, whether to provide status information of the transmission terminal of another transmission management apparatus, based on information of the another transmission management apparatus associated with the at least one candidate counterpart terminal included in the address information of the transmission terminal, to generate a determination result when the receiver receives the connection request information;
    providing, using the processing circuitry, the status information of the transmission terminal of the another transmission management apparatus based on the determination result; and
    acquiring, using the processing circuitry, status information of the at least one candidate counterpart terminal managed by the another transmission management apparatus included in the address information of the transmission terminal for notifying the transmission terminal when the transmission management apparatus provides the status information of the transmission terminal of the another transmission management apparatus,
    wherein, when the connection request information includes service information of a service managed by the another transmission management apparatus, register a notification destination of the status information in the memory using the processing circuitry, and
    wherein, when the connection request information does not include service information of a service managed by the another transmission management apparatus, not register a notification destination of the status information in the memory using the processing circuitry.

8. A non-transitory recording medium storing a plurality of instructions, which, when executed by a processor, cause the processor to perform a method of providing status information in a communication system, comprising:
    storing, in a memory of a transmission management apparatus, address information that associates, for each one of a plurality of request source terminals, request source terminal identification information for identifying the request source terminal configured to request starting communication with at least one candidate counterpart terminal, and candidate counterpart terminal identification information for identifying the at least one candidate counterpart terminal;
    receiving, in the memory, connection request information from a transmission terminal as the request source terminal;
    determining, using processing circuitry, whether to provide status information of the transmission terminal of another transmission management apparatus, based on information of the another transmission management apparatus associated with the at least one candidate counterpart terminal included in the address information of the transmission terminal, to generate a determination result when the receiver receives the connection request information;
    providing, using the processing circuitry, the status information of the transmission terminal of the another transmission management apparatus based on the determination result; and
    acquiring, using the processing circuitry, status information of the at least one candidate counterpart terminal managed by the another transmission management apparatus included in the address information of the transmission terminal for notifying the transmission terminal when the transmission management apparatus provides the status information of the transmission terminal of the another transmission management apparatus,
    wherein, when the connection request information includes service information of a service managed by the another transmission management apparatus, register a notification destination of the status information in the memory using the processing circuitry, and
    wherein, when the connection request information does not include service information of a service managed by the another transmission management apparatus, not register a notification destination of the status information in the memory using the processing circuitry.

* * * * *